US008531950B2

(12) United States Patent
Jaudon et al.

(10) Patent No.: US 8,531,950 B2
(45) Date of Patent: Sep. 10, 2013

(54) DYNAMICALLY MULTIPLEXING USER SESSIONS AMONG MULTIPLE TERMINAL DEVICES

(71) Applicant: Aventura HQ, Inc., Denver, CO (US)

(72) Inventors: Joe Jaudon, Sedalia, CO (US); David Lowrey, Denver, CO (US); Adam Williams, Aurora, CO (US)

(73) Assignee: Aventura HQ, Inc., Denver, CO (US)

( * ) Notice: Subject to any disclaimer, the term of this patent is extended or adjusted under 35 U.S.C. 154(b) by 0 days.

(21) Appl. No.: 13/765,425

(22) Filed: Feb. 12, 2013

(65) Prior Publication Data

US 2013/0185393 A1 Jul. 18, 2013

Related U.S. Application Data

(63) Continuation of application No. 13/490,017, filed on Jun. 6, 2012, now Pat. No. 8,311,047.

(60) Provisional application No. 61/585,965, filed on Jan. 12, 2012.

(51) Int. Cl.
*H04J 1/16* (2006.01)

(52) U.S. Cl.
USPC ............................................ 370/230; 370/331

(58) Field of Classification Search
USPC ............... 370/230, 231, 235, 310.2, 331, 349
See application file for complete search history.

(56) References Cited

U.S. PATENT DOCUMENTS 6,798,742 B1 * 9/2004 Mawhinney et al. ......... 370/230
2009/0067436 A1 * 3/2009 Gast et al. ................ 370/395.53

* cited by examiner

*Primary Examiner* — Brenda H Pham
(74) *Attorney, Agent, or Firm* — Holland & Hart LLP

(57) ABSTRACT

Methods, systems, and devices are described for dynamically multiplexing user sessions among multiple terminal devices. A switch device establishes a session with a host device on behalf of a user logged in to a first terminal device communicatively coupled with the switch device. The switch device forwards packets received from the host device to the first terminal device, the packets associated with the session. The switch device may receive a selection of a second terminal for association with the session while maintaining the session with the host device on behalf of the user. The switch device forwards at least a portion of the packets associated with the session from the host device to the second terminal device responsive to receiving the selection of the second terminal device.

24 Claims, 20 Drawing Sheets

DYNAMICALLY MULTIPLEXING USER SESSIONS AMONG MULTIPLE TERMINAL DEVICES

CROSS-REFERENCE

The present invention is a continuation of U.S. patent application Ser. No. 13/490,017, filed Jun. 6, 2012 by Jaudon et al., entitled "Dynamically Multiplexing User Sessions Among Multiple Terminal Devices", which claims priority to U.S. Provisional Patent Application Ser. No. 61/585,965, filed on Jan. 12, 2012, each of which is incorporated herein by reference in their entirety for all purposes.

BACKGROUND

The present invention relates to the switching and routing of data between devices in a network. In some networks, a user logs in to a system by providing authentication credentials at a terminal device. Upon verification of the authentication credentials, a user virtualization session may be established at one or more host devices. The session allows the user to interact with one or more system resources by sending and receiving session data.

However, in some networks users may frequently migrate between client devices. Typically, to migrate from a first client device to a second client device, a user terminates his or her session by logging out of the first client device and creates a new session by logging in to the second client device. The termination and creation of sessions incidental to user migration is time-consuming, uses network resources, and can be disruptive to the workflow of the user.

Additionally, in some networks a first user at a first terminal device may wish to share a screen image or other session data with a second user at a second terminal device. To do so, the session data to be shared typically must be transmitted twice from the host device to both the first terminal device and the second terminal. This duplicate transmission of the same session data to different terminal devices may consume resources at the host device

SUMMARY

Methods, systems, and devices are described for dynamically multiplexing virtualized user sessions among multiple terminal devices.

In a first set of embodiments, a system for dynamically multiplexing sessions among terminal devices includes a host device configured to host a session associated with a user, a first terminal device, a second terminal device, and a switch device communicatively coupled with the host device and the terminal devices. The switch device may be configured to establish a session between a switch device and a host device on behalf of a user associated with the first terminal device communicatively coupled with the switch device, forward packets associated with the session from the host device to the first terminal device, receive a selection of the second terminal device for association with the session while maintaining the session with the host device on behalf of the user; and forward at least a portion of the packets associated with the session from the host device to the second terminal device responsive to receiving the selection of the second terminal device.

In a second set of embodiments, a method of dynamically multiplexing sessions among terminal devices may include establishing a session between a switch device and a host device on behalf of a user associated with a first terminal device communicatively coupled with the switch device; forwarding at the switch device packets from the host device to the first terminal device, the packets associated with the session; receiving a selection of a second terminal device for association with the session while maintaining the session with the host device on behalf of the user; and forwarding at the switch device at least a portion of the packets associated with the session from the host device to the second terminal device responsive to receiving the selection of the second terminal device.

In a third set of embodiments, a switch device apparatus may include a session module, a switching module, and a terminal selection module. The session module may be configured to establish a session between the switch device apparatus and a host device on behalf of a user associated with a first terminal device communicatively coupled with the switch device apparatus. The switching module may be configured to forward packets from the host device to the first terminal device, the packets associated with the session. The terminal selection module may be configured receive a selection of a second terminal device for association with the session while the session module maintains the session with the host device on behalf of the user. The switching module may be further configured to forward at least a portion of the packets associated with the session from the host device to the second terminal device responsive to receiving the selection of the second terminal device.

In a fourth set of embodiments, a method of dynamically multiplexing data among terminal devices may include establishing a connection with a first device at a switch device; determining a connection state of a user associated with the first device; applying a set of rules to the connection state of the user to identify a second device for receiving data associated with the connection to the first device; and selectively transmitting at least a portion of the data associated with the connection with the first device to the identified second device based on the set of rules.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
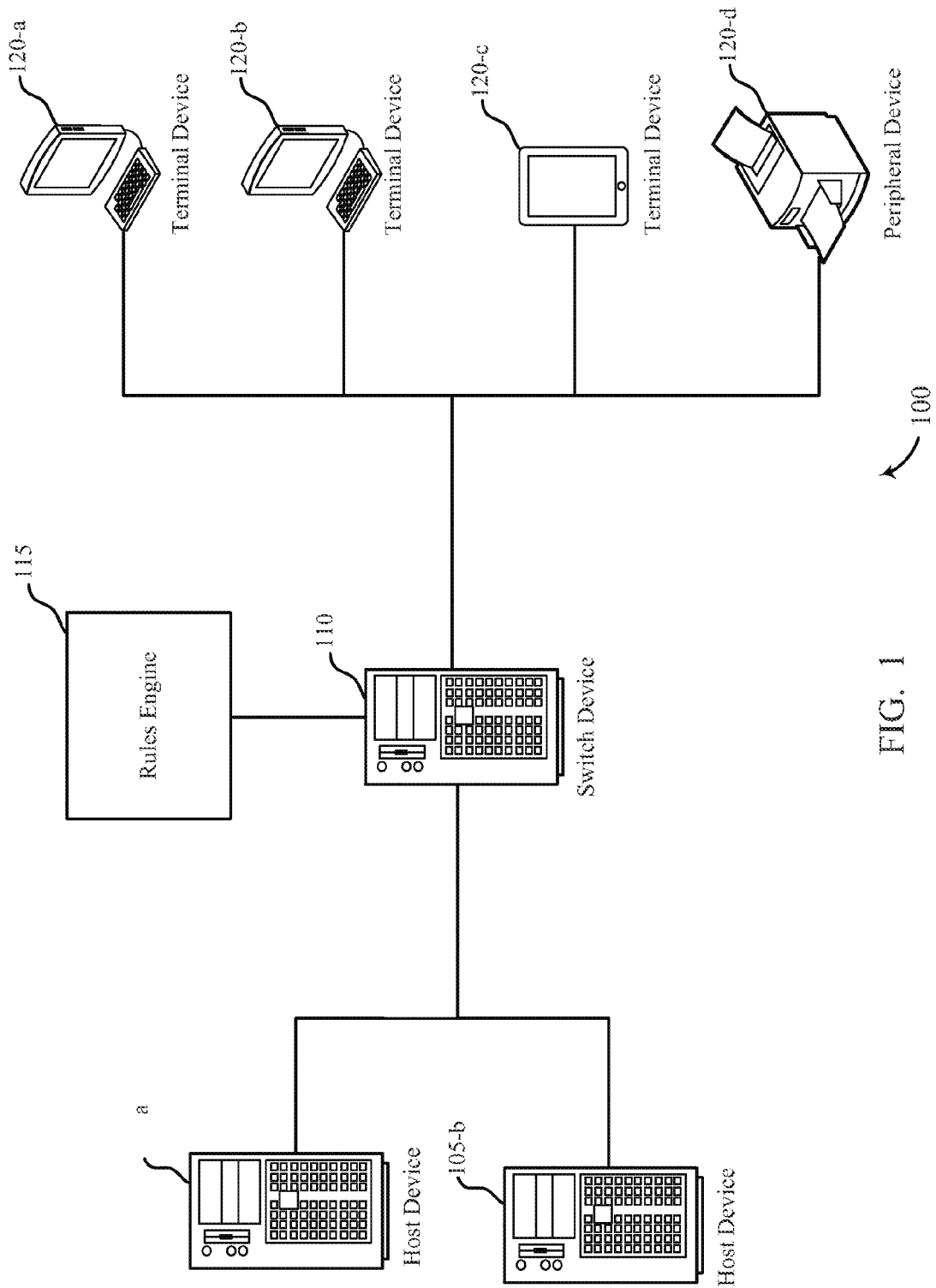
FIG. 1 is a block diagram of an example system including components configured according to various embodiments of the invention.

Methods, systems, and devices are disclosed for dynamically switching and multiplexing session data between terminal devices in a computer network. A host device may be communicatively coupled with a first terminal device through a switch device. The host device may host a virtualized session between the host device and the switch device for a user of the first terminal device. The switch device may maintain the session for the user of the first terminal device and direct session traffic between the first terminal device and the host device. In the event that the user logs out of the first terminal device and moves to a second terminal device, the switch device may maintain the session during a period where the user is not logged in to either machine, and direct the session traffic between the host device and the second terminal device once the user has logged into the second terminal device. The switch device may additionally or alternatively allow the user to share all or a portion of the session data with another user at another terminal device. For example, the switch device may be configured to mirror all or a portion of the session data directed to the user at a first terminal device to a second terminal device selected by the user.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

As used herein, the term "session" refers to a hosted session of a virtual computing environment associated with a particular user that may be accessed from one or more client devices other than the host. For example, a session may include a thin client session, a virtual application session, a virtual machine session, a virtual operating system session, and/or the like. As used herein, a session described as being "between" a host device and a client device refers to the exchange of session packets addressed to the client device from the host device and session packets addressed to the host device from the client device. Thus, where a session is described in the present disclosure as being between a host device and a switch device, the session may be executed and implemented at the host device, and the host device may address all session communications directly to the address of the switch device and receive all session communications directly from the switch device.

Systems, devices, methods, and software are described for dynamic rules-based session data multiplexing in a system of networked devices.

FIG. 1 illustrates an example system 100 including host devices 105, a switch device 110, a rules engine 115, and terminal devices 120 (e.g., workstation 120-a, workstation 120-b, smartphone 120-c, and printer 120-d). Each of these components may be in communication, directly or indirectly.

In the system 100 of FIG. 1, the switch device 110 is communicatively coupled with a number of host devices 105 and terminal devices 120. The switch device 110 may be configured to forward network packets between the host devices 105 and the terminal devices 120 and the peripheral device 125. The switch device 110 may perform layer-3 switching (i.e., routing) and/or layer-2 switching. Thus, in certain examples, the switch device 110 may be a layer-3 router, a layer-2 switch, or a combination of a layer-3 router and a layer-2 switch. In certain examples, the switch device 110 may be implemented by a server configured to implement switching functionality.

Each of the host devices 105 may be configured to host one or more sessions. In certain examples, each host device 105 may include one or more servers. Each of the sessions may be associated with a particular user. A user may access a session hosted by a host device 105 through one of the terminal devices 120. In certain examples, a user may be a person. Alternatively, a user may be a process or a daemon running on one of the terminal devices For example, one of the host devices 105 may host a session for a printing process on printer 120-*d*. In certain examples, the terminal device 120 may be a thin client, and the host device 105-*a* may provide operating system functionality remotely to the terminal device 120, and the terminal device 120 may provide keyboard, video, and mouse (KVM) functionality for the session to the user. Alternatively, the terminal device 120 may execute the operating system based on settings provided for the user from the host device 105.

In one embodiment, a user of a terminal device 120 logs onto a system by providing authentication credentials (e.g., username, password, key card, biometric, and/or other credentials) at the terminal device 120. The switch device 110 forwards the authentication credentials to a host device 105, which authenticates the user and provides the terminal device 120 with access to operating system settings, programs, and files associated with the user over the network including the switch device 110.

The switch device 110 may arbitrate and maintain sessions at the host devices 105 on behalf of users of the terminal devices 120. Thus, when a user logs in to a system by providing authentication credentials at the terminal device 120, the switch device 110 may receive the authentication credentials and initiate a session between the host device 105 and the switch device on behalf of the user using the authentication credentials. In certain examples, the switch device 110 may directly negotiate the session with the host device 105 such that the host device 105 addresses data for the session directly to the switch and is agnostic of the identity of the terminal device 120 associated with the user. Once a session has been established, the switch device 110 may forward session data received from the host device 105 to the terminal device 120. Additionally, the switch device 110 may forward session data received form the terminal device 120 to the host device 105. Thus, the terminal device 120 may act as though it has a direct session with the host device 105, even though the session hosted by the host device 105 is really with the switch device 110. In certain examples, the session data may include keyboard, video and mouse (KVM) and/or related peripheral input/output data. Additionally or alternatively, the session data may include operating system settings, programs, and/or files associated with the user.

The switch device 110 may keep a session associated with a user active without regard to whether the user is currently logged in to a terminal device 120. When the user is logged in to a terminal device 120, the switch device 110 may switch session data between the terminal device 120 and the host device 105. When the user is not logged in to a terminal device 120, the switch device 110 may continue communications with the host device 105 to maintain the session. Because sessions hosted by the host devices 105 are kept active at the switch device 110 rather than at the terminal devices 120, there is no need to initialize a new session each time the user logs onto a different terminal device 120. Rather, the switch device 110 may dynamically switch session data for a particular session between different terminal devices 120 according to the movements of the user. Additionally, the fact that the switch device 110, rather than the terminal devices, maintains the sessions allows the switch device 110 to multiplex session data to multiple terminal devices 120 simultaneously.

The switch device 110 may communicate with the rules engine 115 to determine the proper network destination(s) for session data associated with various sessions hosted by the host devices 105. In certain examples, at least a portion of the rules engine 115 may be implemented by or within the switch device 110. Additionally or alternatively, at least a portion of the rules engine 115 may be implemented by a device external to the switch device 110. The rules engine 115 may apply or enforce a set of event-based rules for multiplexing the session data between the host devices 105 and the terminal devices 120. The switch device 110 may selectively forward session data between the host devices 105 and the terminal devices 120 based on the logical deductions of the rules engine 115.

Figure 2A:
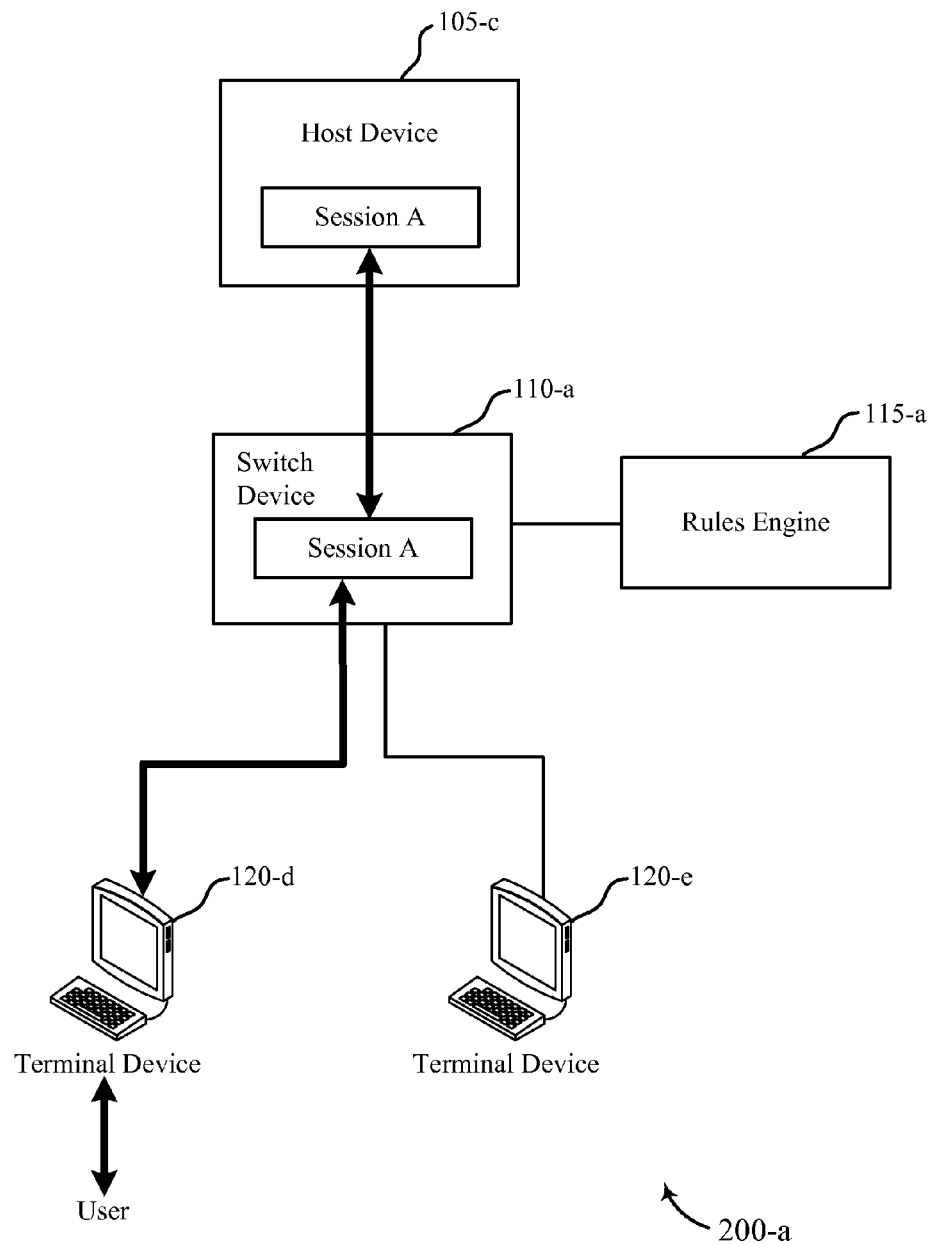
FIG. 2A is a block diagram of an example system including components configured according to various embodiments of the invention.
Figure 2B:
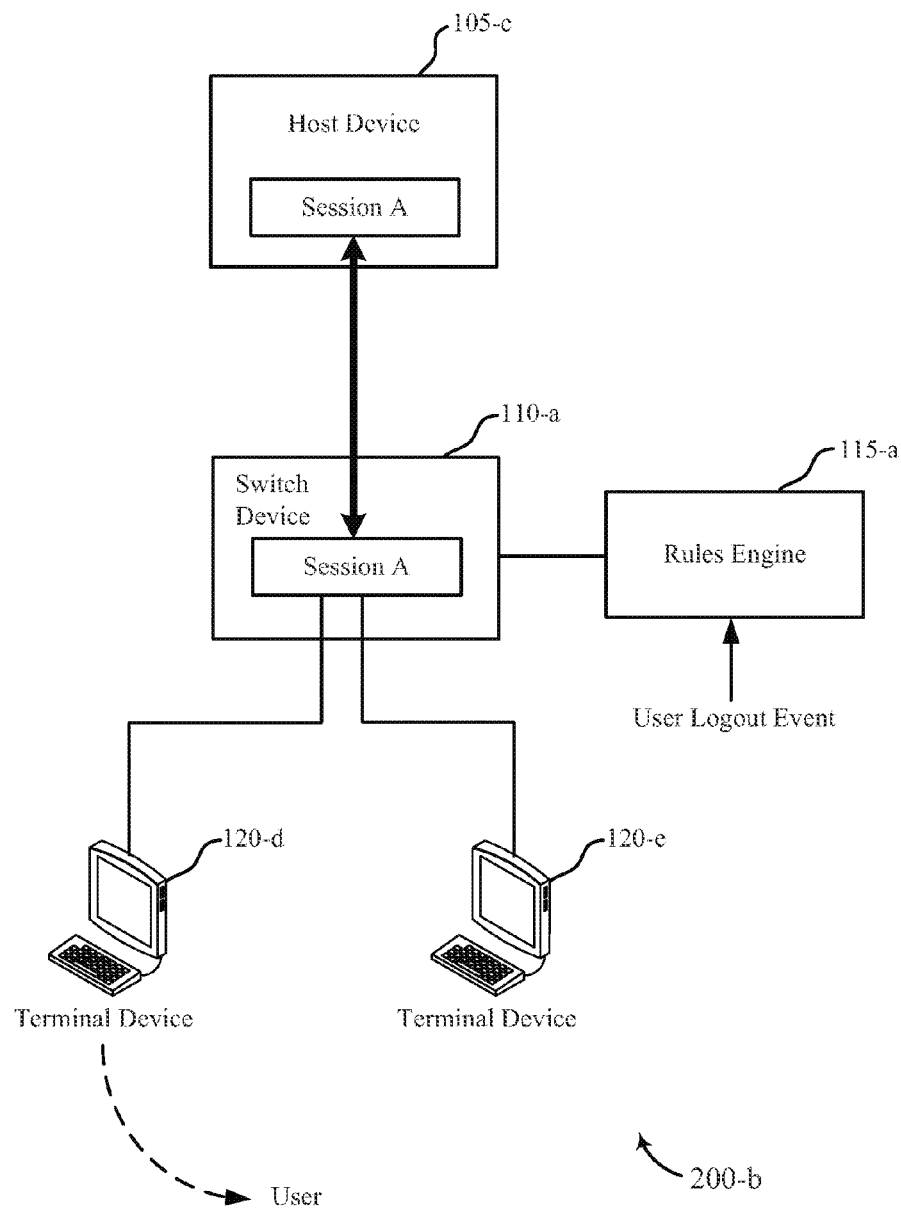
FIG. 2B is a block diagram of an example system including components configured according to various embodiments of the invention.
Figure 2C:
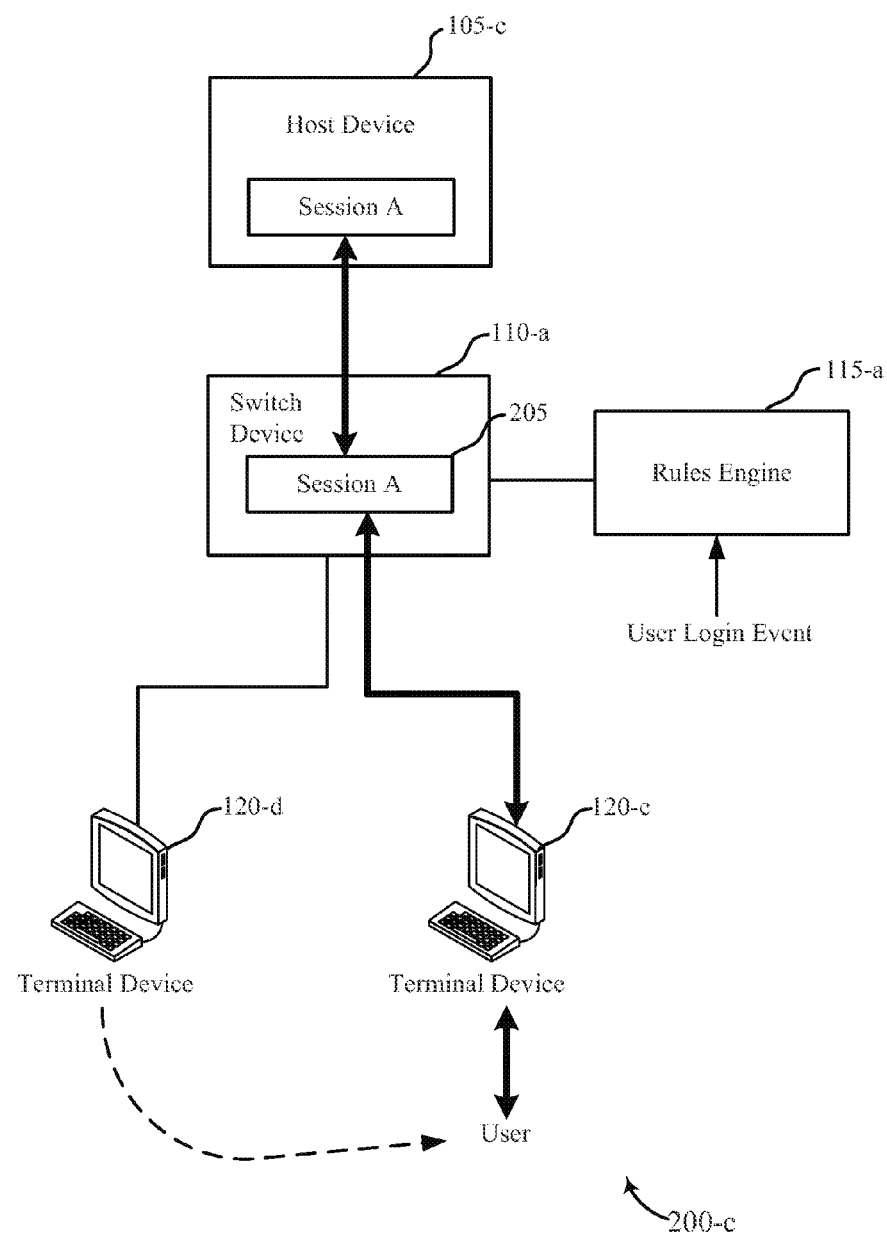
FIG. 2C is a block diagram of an example system including components configured according to various embodiments of the invention.

FIGS. 2A-2C illustrate examples of a system 200 at various points in time. The system 200 of the present example includes a host device 105-*c*, a switch device 110-*a*, a rules engine 115-*a*, and terminal devices 120-*d* and 120-*e*. Each of these components may be in communication, directly or indirectly. The system 200 may be an example of the system 100 described above with reference to FIG. 1. Accordingly, the host device 105-*c* may be an example of one of the host devices 105 of FIG. 1, the switch device 110-*a* may be an example of the switch device 110 of FIG. 1, the rules engine 115-*a* may be an example of the rules engine 115 of FIG. 1, and the terminal devices 120-*d* and 120-*e* may be examples of the terminal devices 120 of FIG. 1.

As shown in FIG. 2A, at a first point in time, a user has logged in to terminal device 120-*d* and the switch device 110-*a* has established session A at host device 105-*c* on behalf of the user. The exchange of session data is illustrated in FIG. 2A using darkened arrows. The switch device 110-*a* may maintain the session such that the host device 105-*c* treats the switch device 110-*a* as the client device for the session. The switch device 110-*a* may forward session data between the host device 105-*c* and the terminal device 120-*d*. Thus, all session data transmitted by or received at the host device 105-*c* may be addressed to or from the switch device 110-*a*, respectively. The switch device 110-*a* may act as a proxy for the terminal device 120-*d*.

In certain examples, the switch device 110-*a* may be configured to modify packets containing session data. For example, the switch device 110-*a* may receive session data packets addressed to the switch device 110-*a* from the host device 105-*c*, modify the header of the packets such that the session data packets are addressed to the terminal device 120-*d*, and forward the modified session data packets to the terminal device 120-*d*.

As shown in FIG. 2B, at a second point in time, the user logs out of terminal device 120-*d*, and a user logout event is provided to the rules engine 115-*a*. The switch device 110-*a* may provide the user logout event to the rules engine 115-*a*. Additionally or alternatively, the rules engine 115-*a* may independently detect the user logout event. The rules engine 115-*a* may apply a set of rules to the user logout event and/or any other applicable parameters to determine that session data should not be forwarded to or from any of the terminal devices 120. Consequently, switch device 110-*a* may maintain communication with the host device 105-*c* and exchange data as needed with the host device 105-*c* to maintain the session active. In certain examples, the rules engine 115-*a* may determine that the session has expired or should be terminated if the user does not log in to one of the terminal devices 12.0 within a threshold period of time. Alternatively, the switch device 110-*a* may maintain the session active indefinitely while the user is logged out of the terminal devices 120.

As shown in FIG. 2C, at a third point in time, the user logs in to terminal device 120-*e*, triggering a user login event at the rules engine 115-*a*. The rules engine 115-*a* may apply a set of rules to the user login event and/or any other applicable data to determine that session currently exists for the user and that the user is now logged in to terminal device 120-*e*. The rules engine 115-*a* may determine that session data is to be forwarded to and from terminal device 120-*e*, and the switch device 110-*a* may consequently forward session data between the host device 105-*c* and terminal device 120-*e*.

Figure 3A:
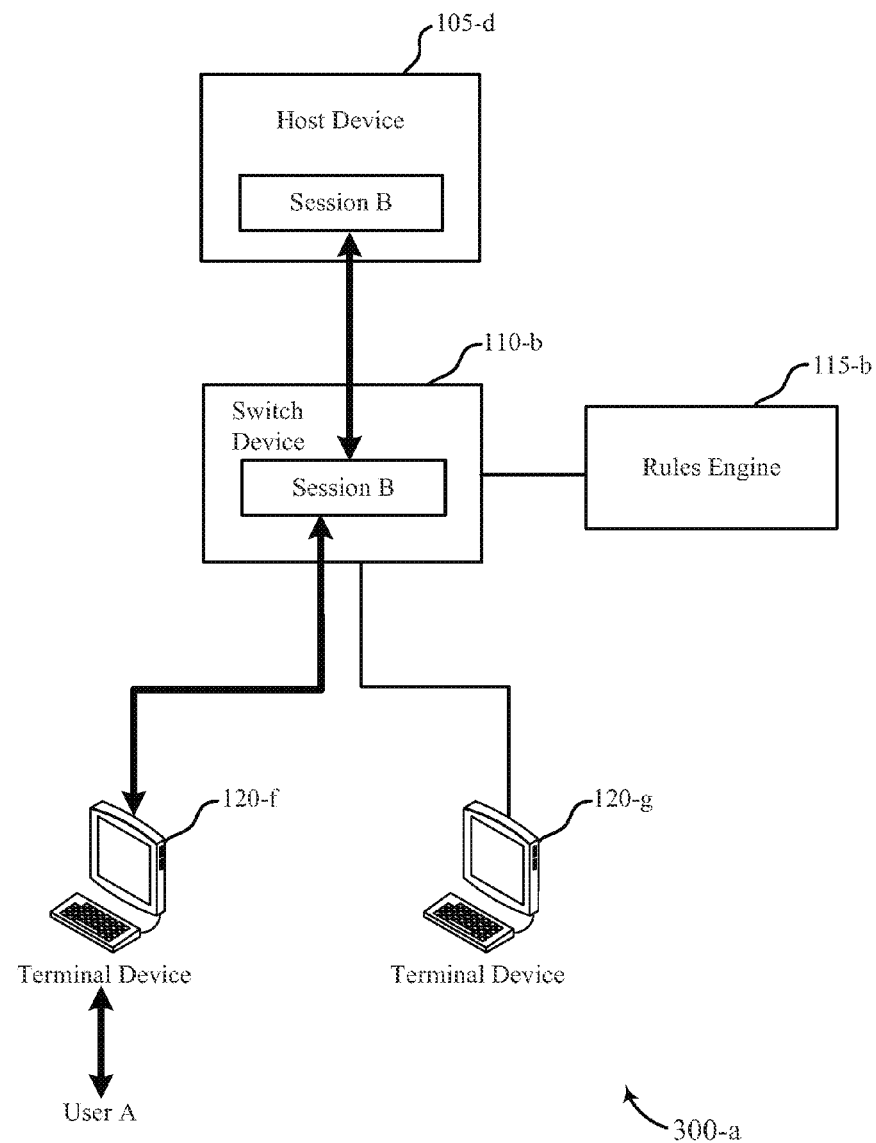
FIG. 3A is a block diagram of an example system including components configured according to various embodiments of the invention.
Figure 3B:
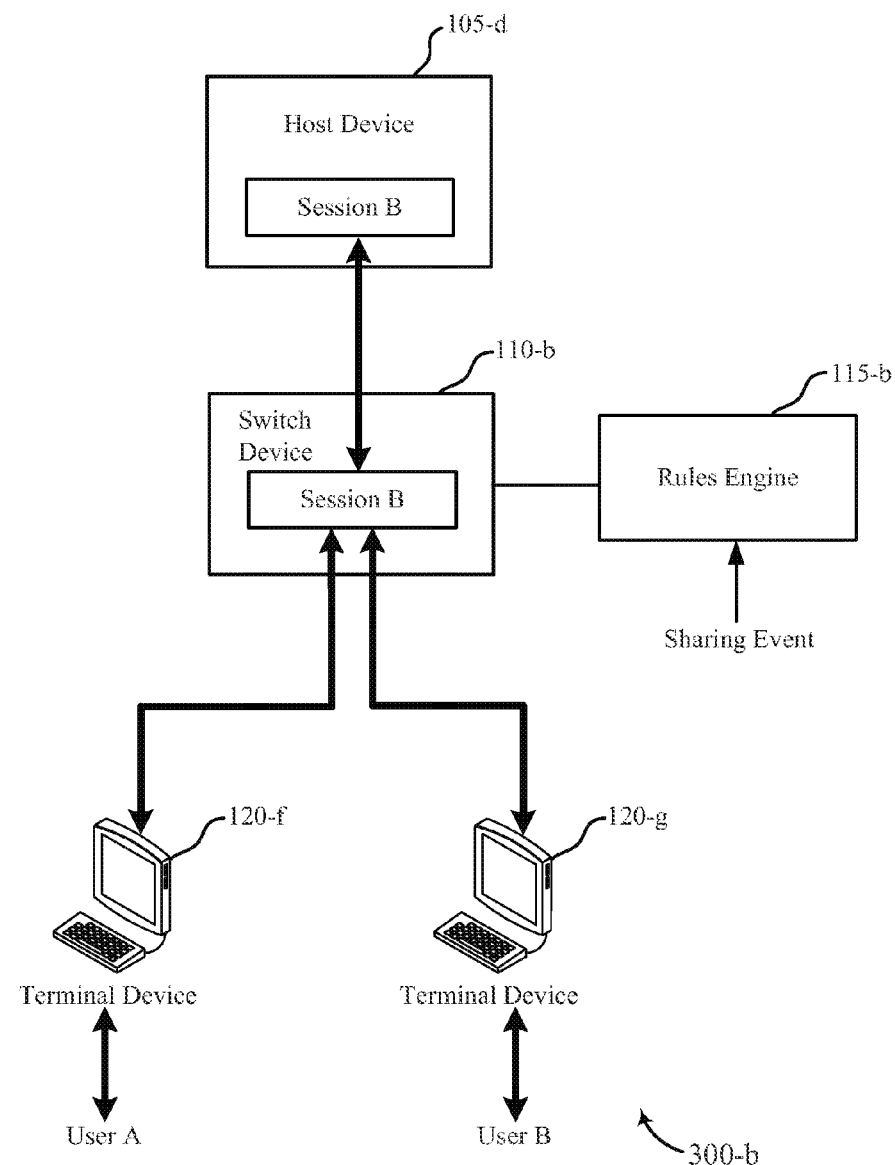
FIG. 3B is a block diagram of an example system including components configured according to various embodiments of the invention.

FIGS. 3A-3B illustrate a system 300 at various points in time. The system 300 includes a host device 105-*d*, a switch device 110-*b*, a rules engine 115-*b*, and terminal devices 120-*f* and 120-*g*. Each of these components may be in communication, directly or indirectly. The system 300 may be an example of the system 100 described above with reference to FIG. 1 or the system 200 described above with reference to FIGS. 2A-2C. Accordingly, the host device 105-*d* may be an example of one of the host devices 105 of FIG. 1 or FIGS. 2A-2C, the switch device 110-*b* may be an example of the switch devices 110 of FIG. 1 or FIGS. 2A-2C, the rules engine 115-*b* may be an example of the rules engines 115 of FIG. 1 or FIGS. 2A-2C, and the terminal devices 120-*f* and 120-*g* may be examples of the terminal devices 120 of FIG. 1 or FIGS. 2A-2C.

As shown in FIG. 3A, at a first point in time, a user A has logged in to terminal device 120-*f* and the switch device 110-*b* has established a session at host device 105-*d* for the user. The exchange of session data is illustrated in FIG. 3A using darkened arrows. The switch device 110-*b* maintains the session such that from the perspective of the host device 105-*d*, the switch device 110-*b* is the terminal device for the session. The switch device 110-*b* forwards session data between the host device 105-*d* and terminal device 120-*f*.

As shown in FIG. 3B, at a second point in time, a sharing event is received at the rules engine 115-*b*. The sharing event may be provided by user A or user B to the rules engine 115-*b* via the switch device 110-*b* and/or some other means of communication. In certain examples, the sharing event may be automatically inferred at the switch device 110-*b* or at the rules engine 115-*b* based on one or more conditions. The rules engine 115-*b* may apply a set of rules to the sharing event and/or to one or more other conditions or parameters to determine that at least a portion of the session data is to be shared with terminal device 120-*g*. The switch device 110-*b* may then share the session data with terminal device 120-*g* according to the determination of the rules engine 115-*b*.

Figure 4A:
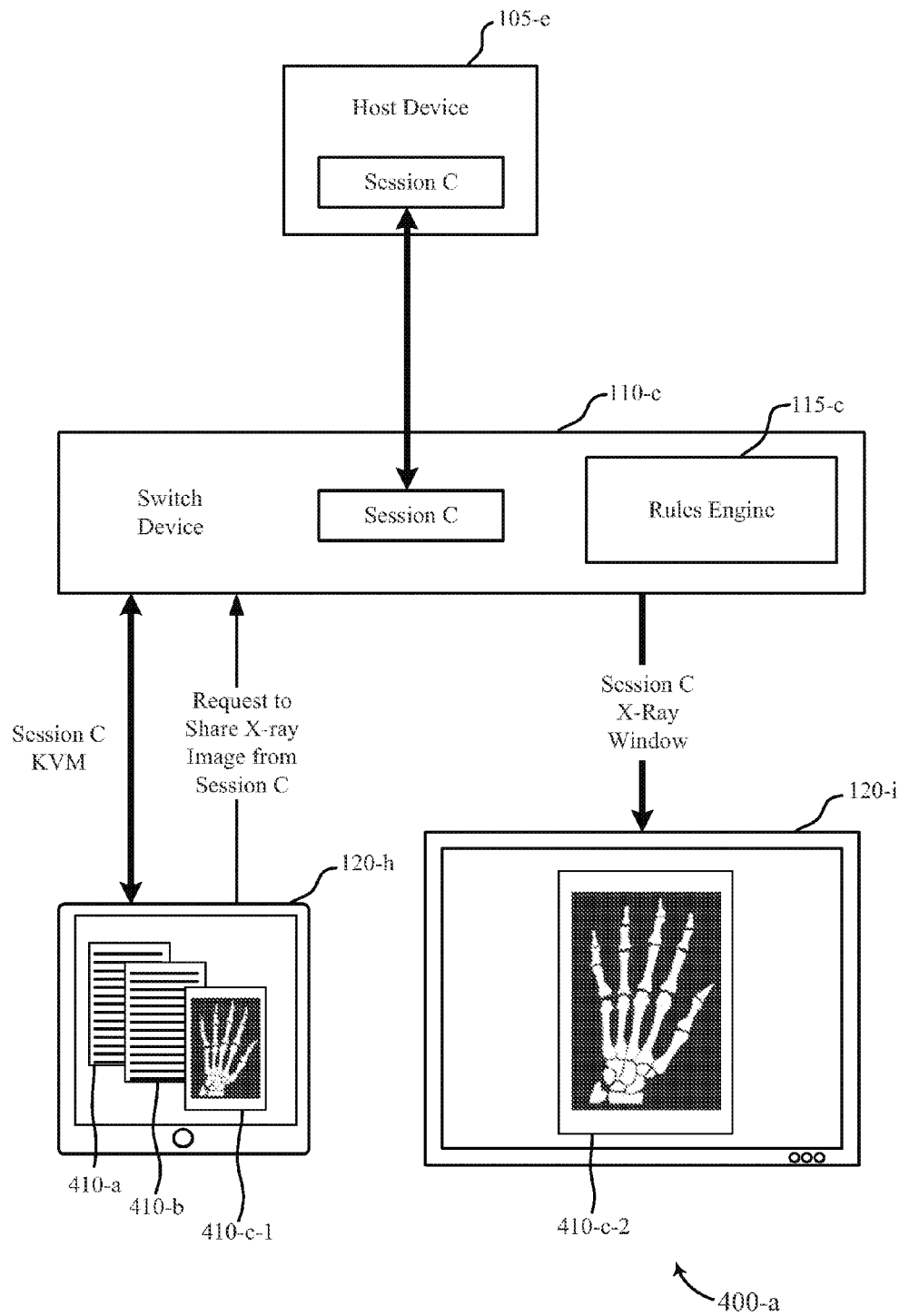
FIG. 4A is a block diagram of an example system including components configured according to various embodiments of the invention.
Figure 4B:
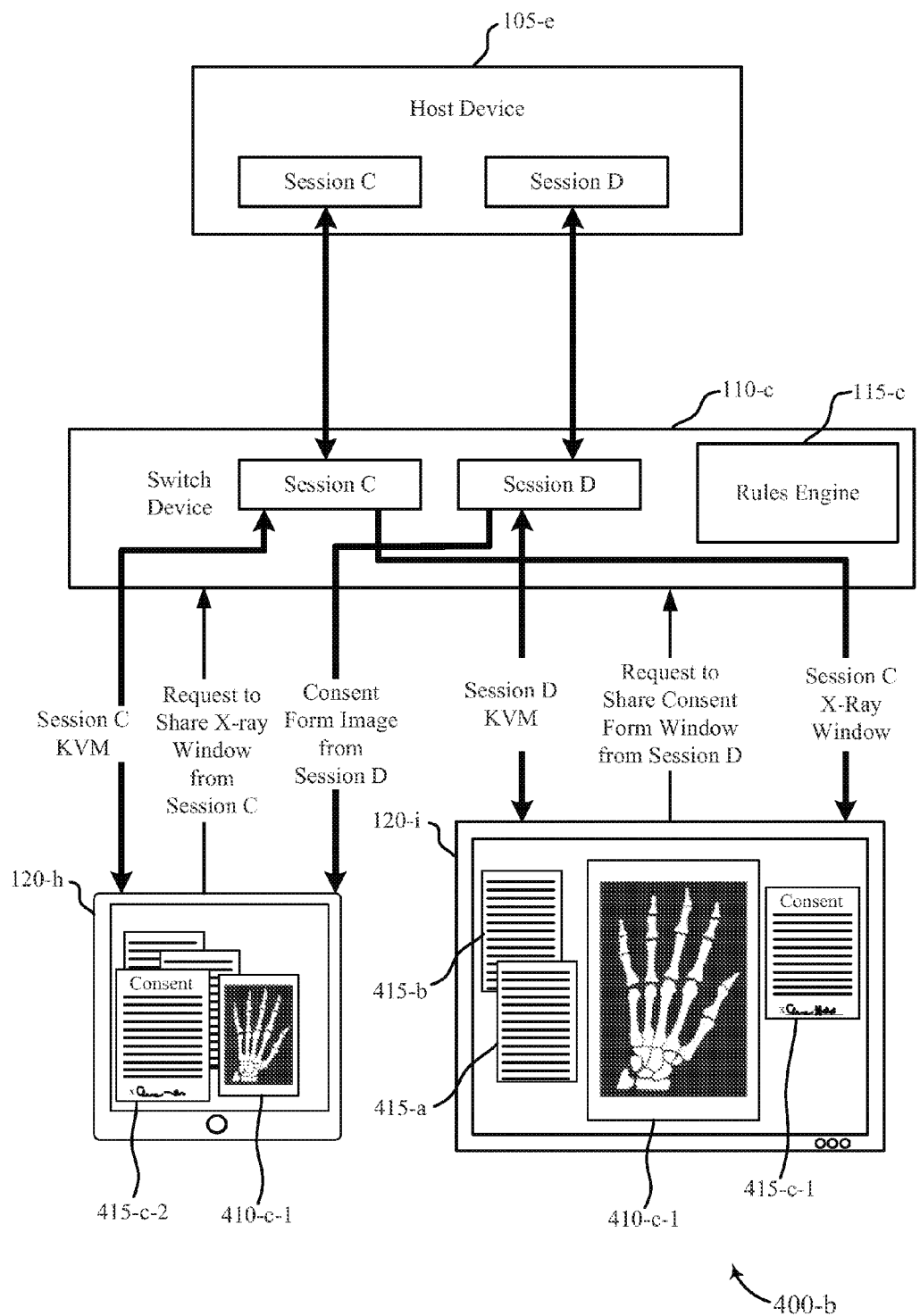
FIG. 4B is a block diagram of an example system including components configured according to various embodiments of the invention.

FIGS. 4A-4B illustrate another example of a system 400 at different points in time. The system 400 includes a host device 105-*e*, a switch device 110-*c*, a rules engine 115-*c*, and terminal devices 120-*h* and 120-*i*. Each of these components may be in communication, directly or indirectly. The system 400 may be an example of the system 100 described above with reference to FIG. 1, the system 200 described above with reference to FIGS. 2A-2C, or the system 300 described above with reference to FIGS. 3A-3B. Accordingly, the host device 105-*e* may be an example of one of the host devices 105 of FIG. 1, FIGS. 2A-2C, or FIGS. 3A-3B, the switch device 110-*c* may be an example of the switch devices 110 of FIG. 1, FIGS. 2A-2C, or FIGS. 3A-3B, the rules engine 115-*c* may be an example of the rules engines 115 of FIG. 1, FIGS. 2A-2C, or FIGS. 3A-3B, and the terminal devices 120-*h* and 1204 may be examples of the terminal devices 120 of FIG. 1, FIGS. 2A-2C, or FIGS. 3A-3B.

As shown in FIG. 4A, at a first point in time, a user A has logged in to terminal device 120-*h* and the switch device 110-*c* has established session C at host device 105-*e* for the user. The exchange of session data is illustrated in FIG. 4A using darkened arrows. The switch device 110-*c* maintains the session such that from the perspective of the host device 105-*e*, the switch device 110-*c* is the terminal device for the session. The switch device 110-*c* forwards packets containing session data between the host device 105-*e* and terminal device 120-*h* to enable Keyboard-Video-Mouse (KVM) or other user interface functionality to terminal device 120-*h* for session C.

In response to a request from the user at terminal device 120-*h*, the switch device 110-*c* of the present example may share session data with terminal device 120-*i* by mirroring some or all network packets containing session data to terminal device 120-*i*. For example, when switch device 110-*c* receives a packet containing session data selected for sharing, the switch device 110-*c* may transmit one copy of the packet to terminal device 120-*h*, and a second copy of the packet to terminal device 120-*i*.

In the present example, a user of terminal device 120-*h* may be a medical practitioner, and a user of terminal device 120-*i* may be a patient. The medical practitioner may view a number of different windows 410 associated with Session C on terminal device 120-*h*, including a window 410-*c*-1 showing x-ray results for the patient. The medical practitioner may submit a request to the switch device 110-*c* to share the x-ray window 410-*c*-1 with the patient. This request may be an example of the sharing event shown in FIG. 3B.

If the rules engine 115-*c* permits this sharing to occur, the switch device 110-*c* may filter packets from the host device 105-*e* for those packets associated with Session C which carry data related to the x-ray results window 410-*c*-1. The identified packets may then be mirrored at the switch device 110-*c* and delivered to both terminal device 120-*h* and terminal device 120-*i*. Terminal device 120-*i* may then display a window 410-*c*-2 duplicating the window 410-*c*-1 of x-ray results to the patient in real time and without requiring the switch device 110-*c* to receive duplicitous session data from the host device 105-*e*, thereby conserving network resources.

FIG. 4B shows an example of system 400 at a later point in time. As shown in FIG. 4B, session D has been established, at the host device 105-*e* for the patient using terminal device 120-*i*. The switch device 110-*c* may maintain session D at the host device 105-*e* on behalf of terminal device 120-*i*. The switch device 110-*c* may also continue to maintain session C at the host device 105-*e* on behalf of terminal device 120-*h*, in use by the medical practitioner.

The switch device 110-*c* may receive packets associated with session D from the host device 105-*c* and redirect them to terminal device 120-*i* to provide KVM functionality for session D to terminal device 120-*i*. These packets may include data used to display a window 415-*c*-1 containing a consent form on terminal device 120-*i*. For example, the patient may electronically sign the displayed consent form through the user interface of terminal device 120-*i*. In certain examples, the patient may wish to share the consent form window with the medical practitioner using terminal device 120-*h*. Thus, the patient may submit a request to the switch device 110-*c* through terminal device 120-*i* to share the consent form window 415-*c*-1 with terminal device 120-*h*. This request may be an example of the sharing event shown in FIG. 3B.

Once the request is received at the switch device 110-*c*, the rules engine 115-*c* may apply a set of relevant rules to the sharing event associated with the request to determine whether the request is to be granted. The rules may be based on security considerations, user identities, time of day, the location of terminal devices 120, the content of the window for which sharing is requested, and/or any other relevant factor. If the rules engine 115-*c* infers from the rules that the request is to be granted, the switch device 110-*c* may begin to automatically filter packets received from the host device for packets associated with session D, specifically those packets related to the display of consent form window 415-*c*-1. As those packets are identified at the switch device 110-*c*, the switch device 110-*c* may copy and forward the data in the identified packets to terminal device 120-*h*, which may display a window 415-*c*-2 that duplicates the consent form window 415-*c*-1 on terminal device 120-*i*.

Thus, in FIG. 4B, the switch device 110-*c* may dynamically forward user interface elements of different sessions executed and hosted at the host device 105-*e* to different terminal devices 120 based on the application of rules to changing events and circumstances. All of this functionality may occur without the host device 105-*e* being aware of or communicating with the terminal devices 120. Additionally, the host device 105-*c* need not duplicate data for sharing among the terminal devices 120, as this functionality is outsourced to the switch device 110-*c*.

Figure 5A:
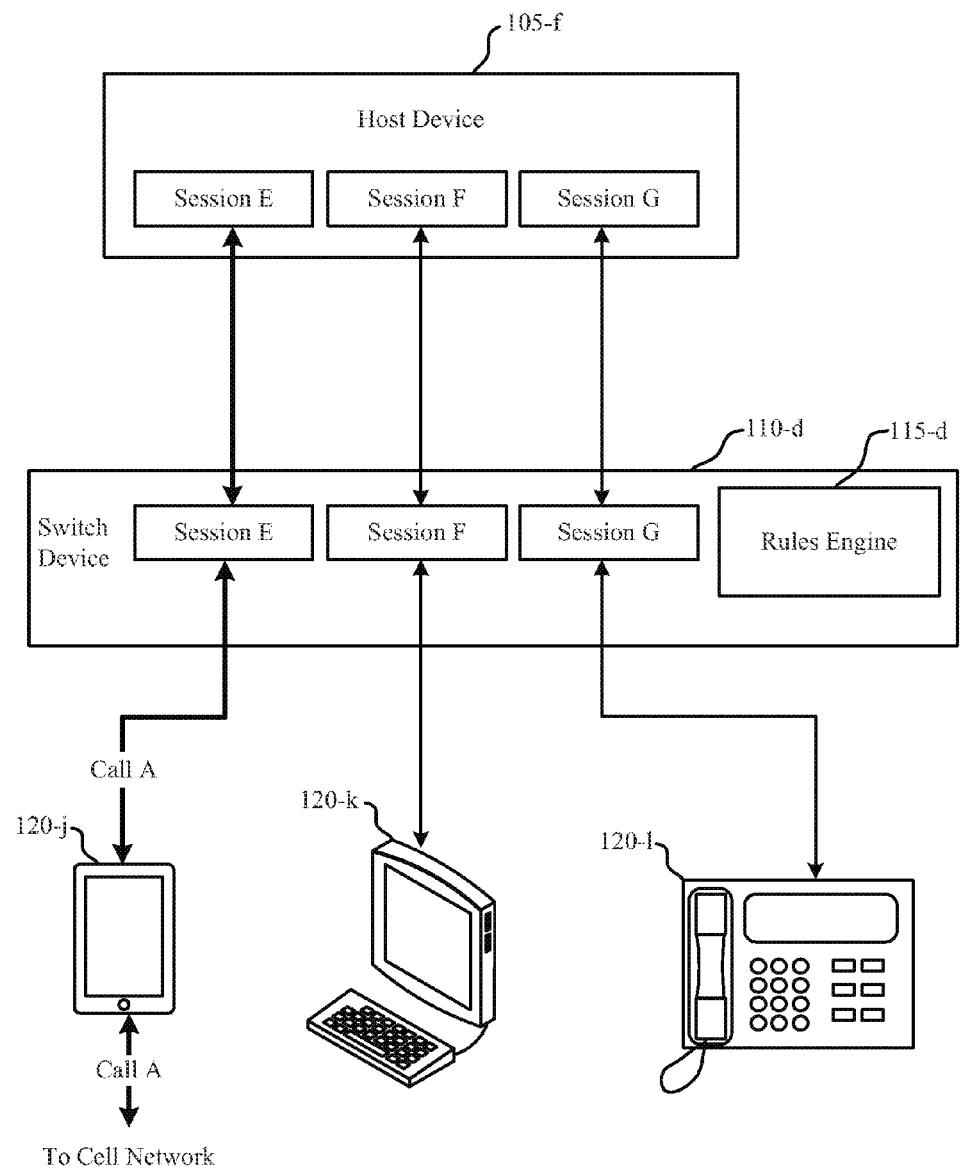
FIG. 5A is a block diagram of an example system including components configured according to various embodiments of the invention.
Figure 5B:
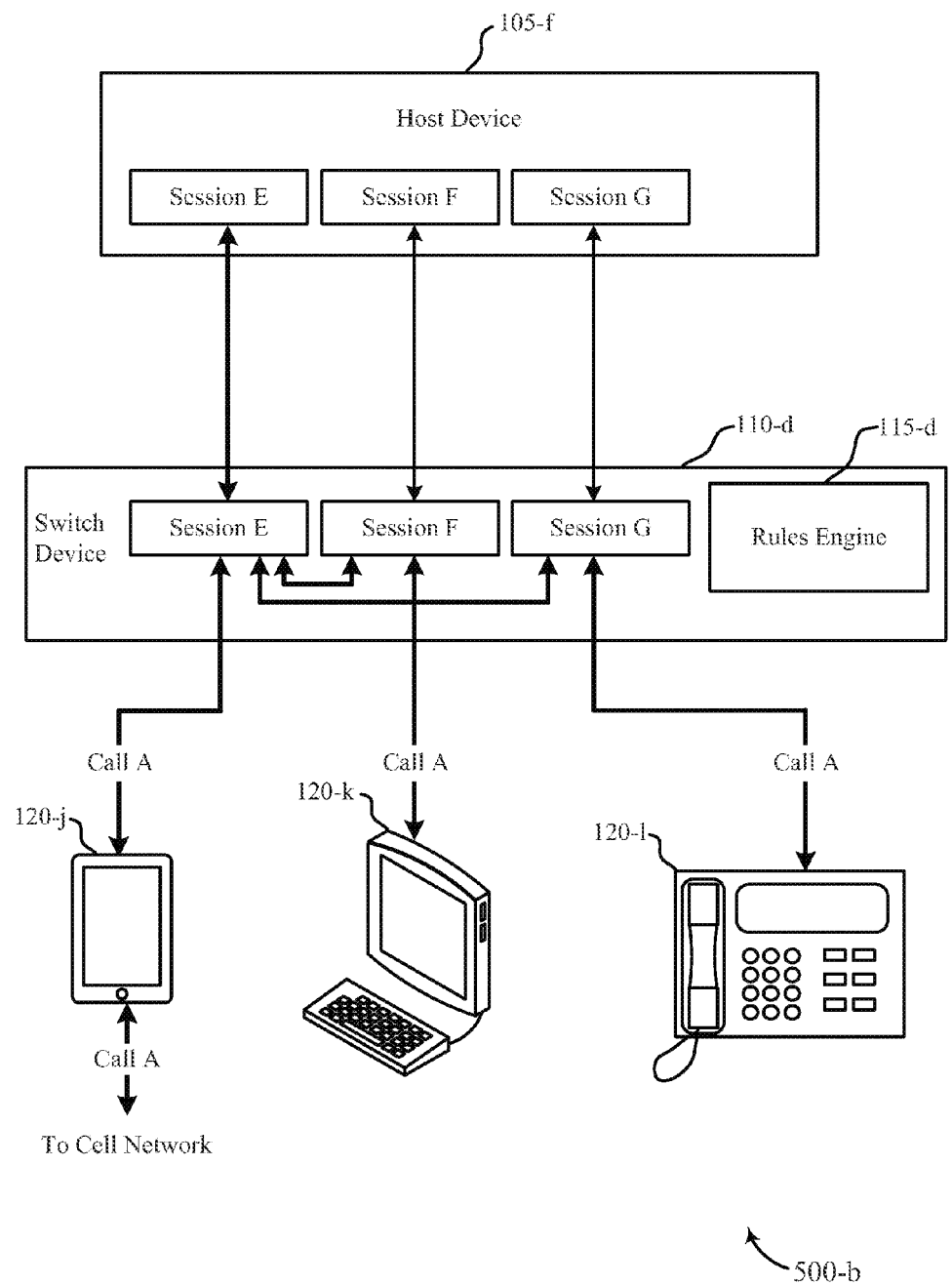
FIG. 5B is a block diagram of an example system including components configured according to various embodiments of the invention.

FIGS. 5A-5B illustrate another example of a system 500 at different points in time. The system 500 includes one or more host devices 105-*f*, a switch device 110-*d*, a rules engine 115-*d*, and terminal devices 120-*j*, 120-*k*, and 120-*l*. Each of these components may be in communication, directly or indirectly. The system 500 may be an example of any of the systems described above with reference to the preceding Figures.

As shown in FIG. 5A, at a first point in time, a smartphone terminal device 120-*j* may be associated with Session E at the host device 105-*f* through the switch device 110-*d*. The smartphone terminal device 120-*j* may carry out a voice call over a cellular network and transmit data from that call to Session E at the host device 105-*f* via the switch device 110-*d*. In response to a request from a user associated with Session E, a workstation terminal device 120-*k* and a telephone terminal device 120-*l* may be selected to participate in the call. The workstation terminal device 120-*k* and the telephone terminal device 120-*l* may each have their own respective sessions at the host device 105-*f* through the switch device 110-*d*.

As shown in FIG. 5B, after the workstation terminal device 120-*k* and the telephone terminal device 120-*l* have been selected for participation in the call, the rules engine 115-*d* may duplicate and mirror packets associated with the call in Session E across Session F and Session G. In this way, a user associated with the workstation terminal device 120-*k* and a user associated with the telephone terminal device 120-*l* may listen to the call taking place between the smartphone terminal device 120-*j* and the cellular network in real-time.

In certain examples, the workstation terminal device 120-*k* and the telephone terminal device 120-*l* may also be able to transmit audio signals to the switch device 110-*d* for real-time inclusion in the call. Thus, a call over the cellular network at smartphone terminal device 120-*j* may become a conference call with participants at the workstation terminal device 120-*k* and the telephone terminal device 120-*l*. The switch device 110-*d* may be configured to merge streams of incoming microphone data related to the call from Session E, Session F, and Session G into a single stream of audio data and duplicate the single stream across the sessions.

Figure 6A:
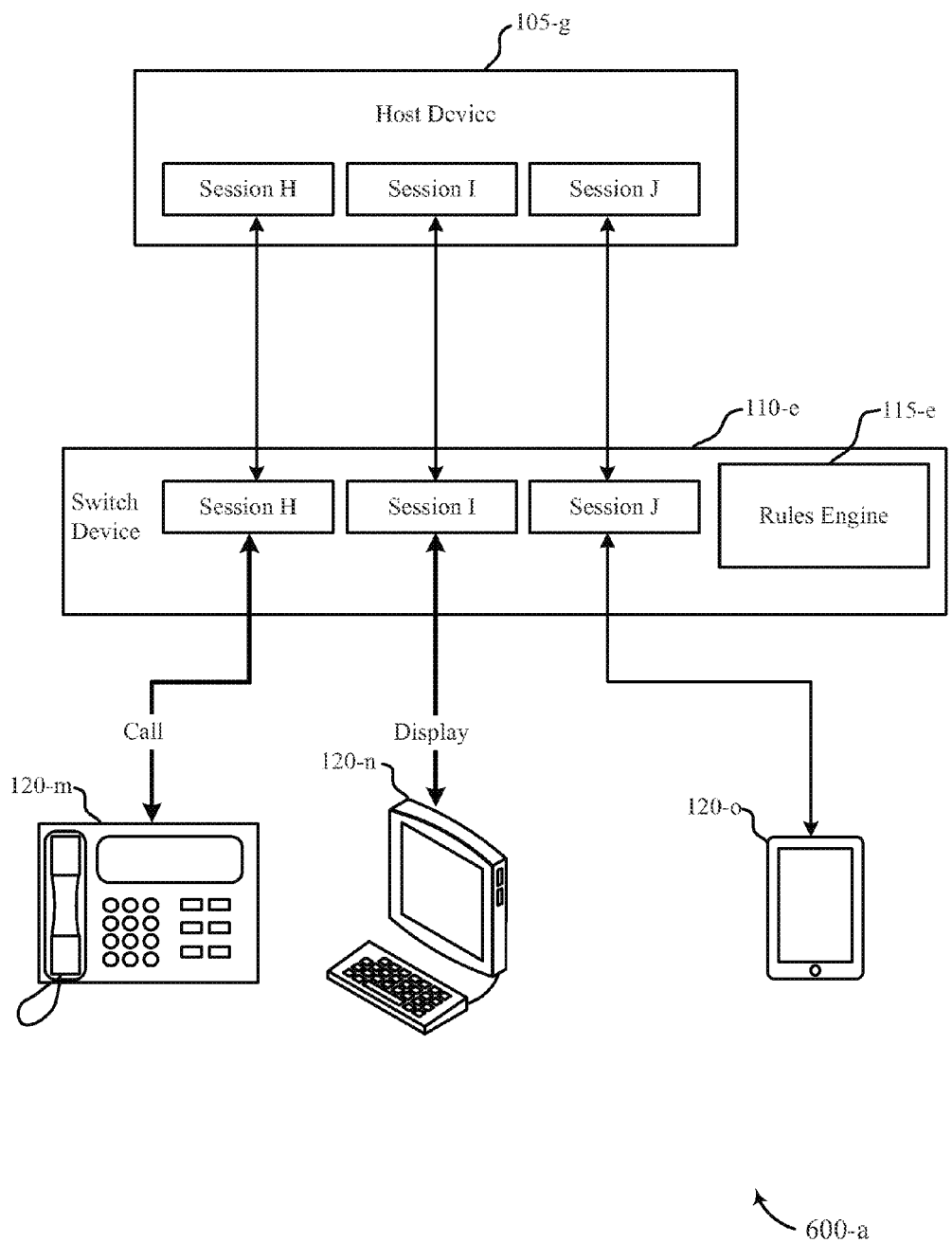
FIG. 6 is a block diagram of an example system including components configured according to various embodiments of the invention.
Figure 6B:
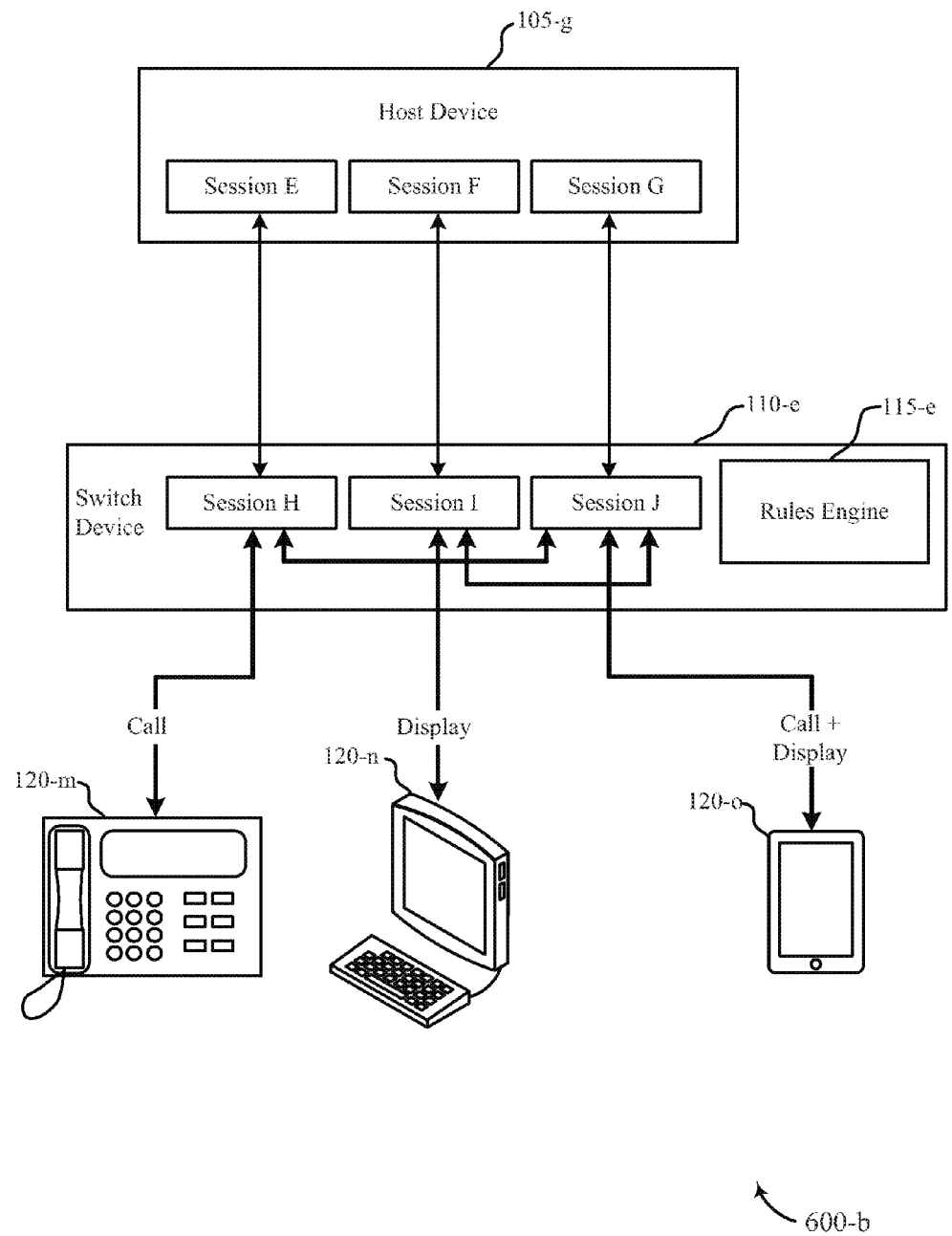

FIGS. 6A-6B illustrate another example of a system 600 at different points in time. The system 600 includes one or more host devices 105-*g*, a switch device 110-*e*, a rules engine 115-*e*, and terminal devices 120-*m*, 120-*n*, and 120-*o*. Each of these components may be in communication, directly or indirectly. The system 600 may be an example of any of the systems described above with reference to the preceding Figures.

As shown in FIG. 6A, at a first point in time, a telephone terminal device 120-*m* may be associated with Session H at the host device 105-*g* through the switch device 110-*e*. The telephone terminal device 120-*m* may carry out a voice call through Session H. A workstation terminal device 120-*n* may receive display data associated with Session I from the host device 105-*g* through the switch device 110-*e*. A smartphone terminal device 120-*o* may be associated with Session J at the host device 105-*g* through the switch device 110-*e*. The smartphone terminal device 120-*o* may be selected to participate in a collaboration activity in which the smartphone terminal device 120-*o* participates in the call associated with the telephone terminal device 120-*m* and receives a portion of the Session I display shown on workstation device 120-*n*. For example, a single user may be participating in the call at telephone terminal device 120-*m* and viewing a window of the display at workstation terminal device 120-*n*, and wish to add a user of the smartphone terminal device 120-*o* to the call to discuss the contents of the window.

As shown in FIG. 6B, after the smartphone terminal device 120-*o* has been selected for participation in the call, the rules engine 115-*d* may duplicate and mirror packets associated with the call of Session H and the display of Session I to the smartphone terminal device 120-*o*. In this way, the user of the smartphone terminal device 120-*m* may listen to the call taking place at the telephone terminal device 120-*m* and view the shared portion of the display of workplace terminal device 120-*n* in real-time.

In certain examples, the smartphone terminal device 120-*o* may also be able to transmit audio signals to the switch device 110-*d* for inclusion in the call. Thus, the user of the smartphone terminal device 120-*o* may join the call as a conference participant. The switch device 110-*d* may be configured to merge the display data stream of Session I with the call data associated with Session H and Session J into a single stream of audio and visual data, and duplicate the single stream across the sessions.

Figure 7:
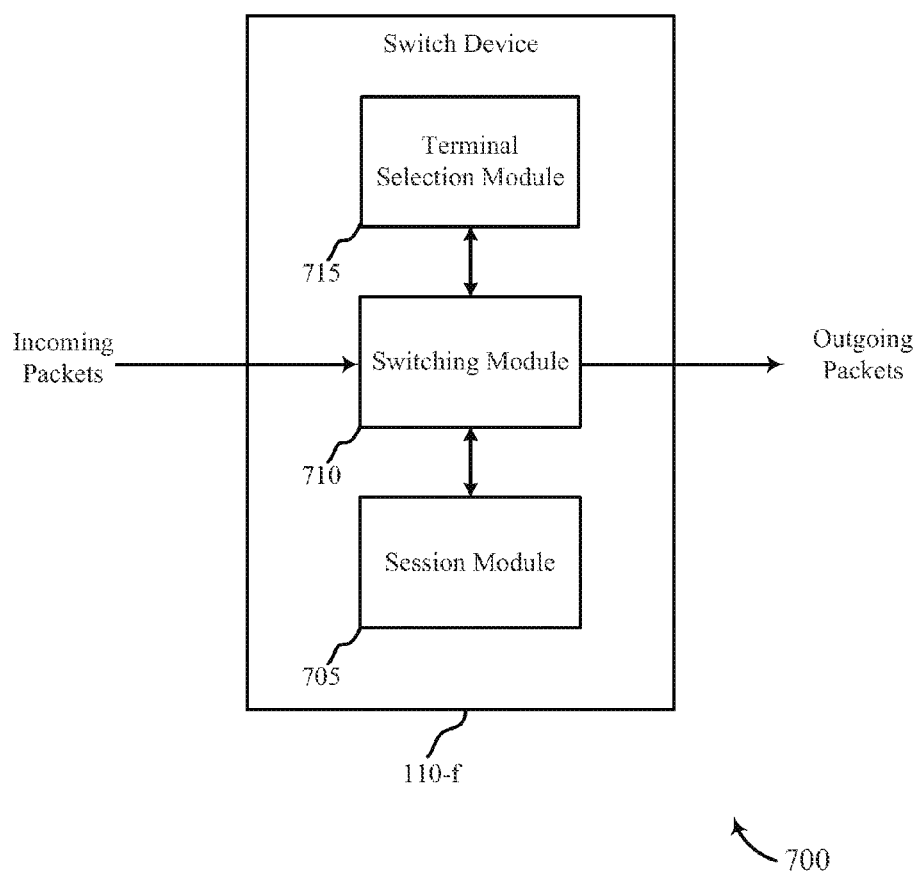
FIG. 7 is a block diagram of an example switch device including components configured according to various embodiments of the invention.

FIG. 7 is a block diagram 700 of an example switch device 110-*f*. The switch device 110-*f* may be an example of any of the switch devices 110 described above with reference to FIGS. 1-6B. The switch device 110-*f* of the present example includes a session module 705, a switching module 710, and a terminal selection module 715. Each of these components may be in communication, directly or indirectly.

The session module 705 may be configured to establish a session between the switch device 110-*f* and a host device (e.g., host device 105 of FIGS. 1-6B) on behalf of a user associated with a first terminal device communicatively coupled with the switch device 110-*f*. The session may be established using login credentials (e.g., a username and password, access card tap, key fob, biometric data, or other authentication credentials or tokens) received from the user at the first terminal device. In certain examples, the session may be established at the host device based on a set of rules, settings, and preferences associated with the user of the first terminal device. The switch device 110-*f* may interact with the host device as if the switch device 110-*f* were a terminal device. From the point of view of the host device, the switch device 110-*f* may be treated as the terminal device for the session.

The switching module 710 may be configured to receive packets from the host device, the packets being associated with the session. The session packets received at the switch device 110-*f* from the host device may include packets for displaying a user interface of the session to a user. For example, the session packets received at the switch device 110-*f* may be used to establish remote KVM functionality. The switching module 710 may forward the session packets received from the host device to the first terminal device to allow the first terminal device to construct the user interface and provide the user interface to the user.

The switching module 710 may further be configured to receive session packets from the first terminal device and forward those packets to the host device. The packets received from the first terminal device may be related to input from the user at the first terminal device or from another source. The switching module 710 may forward the session packets received from the first terminal device to the host device.

In certain examples, the forwarding of packets performed by the switch device 110-*f* may include modifying a source address or a destination address of the packets. In additional or alternative examples, the forwarding of the packets may include reformatting the packets from a format associated with the host device to a format associated with the first terminal device, or vice versa. In still other examples, the forwarding of the packets performed by the switch device 110-*f* may be a simple layer-2 switching operation.

The terminal selection module 715 may be configured to receive a selection of a second terminal device for association with the session while the session module 705 maintains the session with the host device on behalf of the user. In certain examples, the second terminal device may be selected to replace the first terminal device in receiving and transmitting data for the session. Thus, the selection of the second terminal device may be inferred in response to a determination that the user has logged off of the first terminal device, moved to a location of the second terminal device, and logged on to the second terminal device. In such cases, the switching module 710 may ensure that the forwarding of session packets to the first terminal device is terminated after the user has logged off of the first terminal device. Even when the user is not logged on to either machine, the session module 705 may maintain the session active at the host device on behalf of the user.

In additional or alternative examples, the second terminal device may be selected for sharing or mirroring a portion of the session user interface while the user remains logged on to the first terminal device. In such examples, the selection of the second terminal device may be received as a request from the user to share a portion of the session with the second terminal device.

In certain examples, the terminal selection module 715 may identify at least one event associated with the user and communicate with a rules engine (e.g., rules engine 115 of FIG. 1) to apply a set of rules to the at least one event to identify at least one instruction to forward at least a portion of the packets associated with the session to the second terminal device. In such examples, the identification of the at least one instruction by the rules engine may constitute the receipt of the selection of the second terminal device at the terminal selection module 715.

In response to the selection of the second terminal device, the switching module may be configured to forward at least a portion of the packets associated with the session from the host device to the second terminal device. In examples where the second terminal device replaces the first terminal device as the primary point for the user to access the session, all or substantially all of the session packets received from the host device may be forwarded to the second terminal device. In examples where the second terminal device is selected merely to receive a mirrored or shared portion of the session user interface, the session packets may be further filtered to identify packets related to the portion of the user interface to be shared, and the identified packets may be forwarded to the second terminal device.

In additional or alternative examples, there may be no requirement to establish a session to effectuate the selective switching and routing of data between terminal devices at the switch device 110-*f*. The switching module 710 may be configured to switch data between the terminal devices based on a number of alternative criteria. In certain examples, the switching module 710 may be configured to selectively forward data between terminal devices based on a connection state of a current user, that is, whether a session currently exists for a particular user or whether such a session is active at a host device or in a dormant state.

For example, a user may log on to a terminal device, the switch device 110-*f* may determine that no current session exists for the user at a host device, and selectively forward data from a generic session to the terminal device through which the user may authenticate himself or herself and cause a new session specific to the user to be generated at a host device and switched to the terminal device. In other examples, the switch device 110-*f* may automatically forward a call from an IT administrator to a phone associated with the user upon determining that a session for the user is inactive or has unresolved technical issues. The switch device 110-*f* may take many different types of action in response to determining the connection state of a user, including actions that are not directly related to forwarding and switching data between terminal devices.

Figure 8:
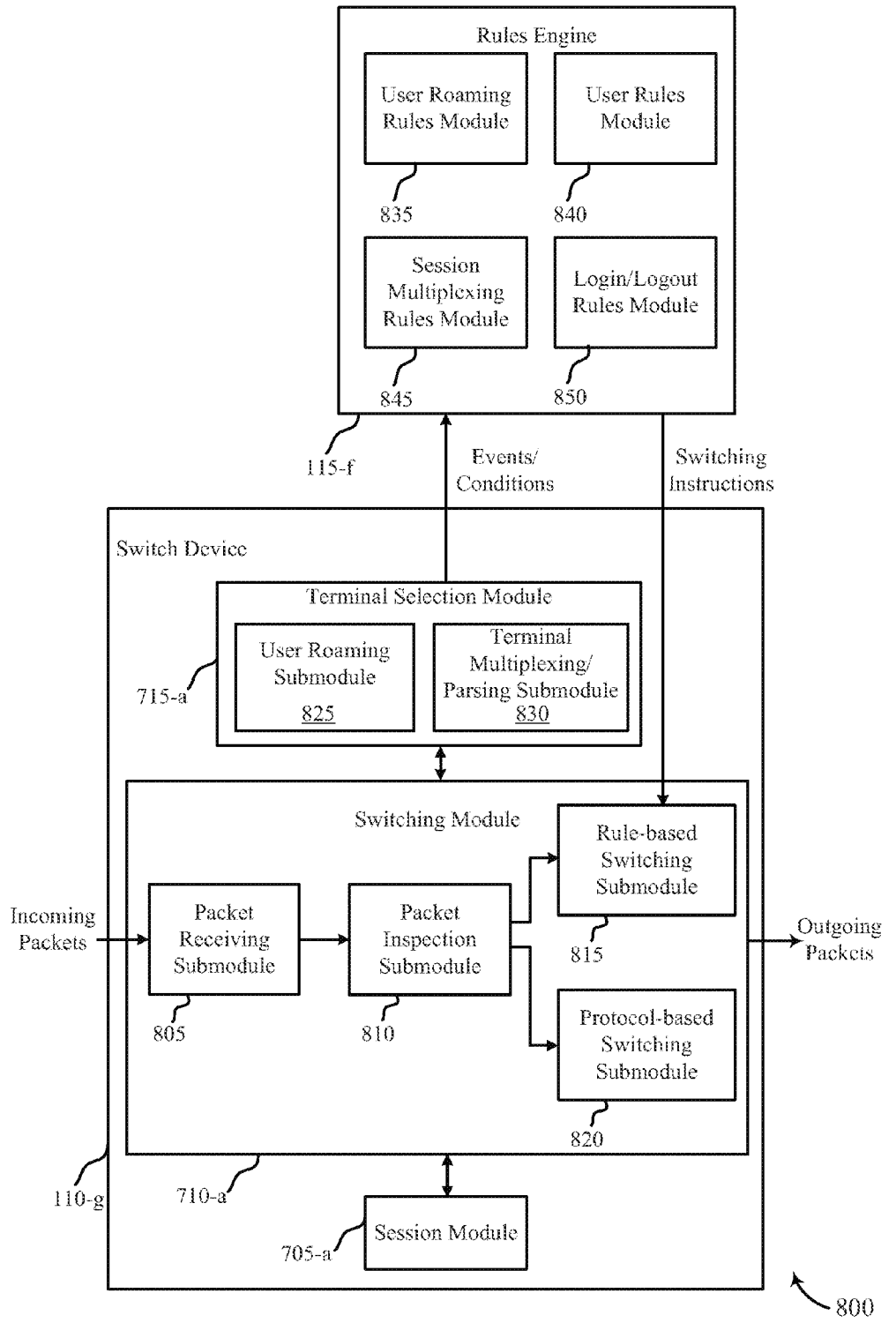
FIG. 8 is a block diagram of an example system including components configured according to various embodiments of the invention.

FIG. 8 is a block diagram of an example system 800 including a switch device 110-*g* and a rules engine 115-*f*. Each of these components may be in communication, directly or indirectly. In certain examples, the rules engine 115-*f* may be implemented by or within the switch device 110-*g*. The system 800 may be an example of any of the systems with reference to FIGS. 1-7. Accordingly, the switch device 110-*g* may be an example of the switch devices 110 of FIGS. 1-7. The rules engine 115-*f* may be an example of the rules engines 115 of FIG. 1, FIGS. 2A-2C, or FIGS. 3A-3B.

The switch device 110-*g* may include a session module 705-*a*, a switching module 710-*a*, and a terminal selection module 715-*a*, which may be respective examples of the session module 705, the switching module 710, and the terminal selection module 715 described above with reference to FIG. 7.

the present example, the switching module 710-*a* includes a packet receiving submodule 805, a packet inspection submodule 810, a rule-based switching submodule 815, and a protocol-based switching submodule 820. The packet receiving submodule 805 may receive incoming packets from a host device (e.g., host device 105 of FIGS. 1-7B) and a number of terminal devices (e.g., terminal devices 120 of FIGS. 1-7B). The received packets may include data related to one or more sessions hosted by the host device and maintained at the session module 705-*a* on behalf of users of the terminal devices.

The packet receiving submodule 805 may forward the received packets to the packet inspection submodule 810, which may examine the content of each received packet. In certain examples, header content for the packet may be examined at the packet inspection submodule 810. Additionally or alternatively, the packet inspection submodule 810 may perform deep packet inspection on the received packets to analyze payload content of the packets. A rule-based switching submodule 815 may switch the received packets based on the content of the packets and switching instructions received from the rules engine 115-*f*. A protocol-based switching submodule 820 may switch one or more of the received packets based on a static switching protocol.

The terminal selection module 715-*a* may include a user roaming submodule 825 and a terminal multiplexing/parsing submodule 830. The user roaming submodule 825 may detect when a user logs off of the a first terminal device and later logs on to a second terminal device. The terminal multiplexing/ parsing submodule 830 may receive requests to share all or a portion of the data for a particular session maintained at the host device. These events and conditions detected at the user roaming submodule 625 and the terminal multiplexing/parsing submodule 830 may be communicated to the rules engine 115-f, which may apply one or more relevant rules to the events or conditions to update the switching instructions at the rule-based switching submodule 815.

The rules engine 115-f may include a user roaming rules module 835 for implementing rules related to users roaming between different terminal devices, a user rules module 840 for implementing rules specific to individual users or classes of users, a session multiplexing rules module 845 for implementing rules related to the sharing or mirroring of session data to multiple terminal devices simultaneously, and a login/logout rules module 850 for implementing rules related to users logging in and out of terminal devices and sessions.

To illustrate the interoperation of the various components in the system 800, consider the scenario where a the session module 705-a initiates and maintains a new session at a host device on behalf of a user of a first terminal device. Packets containing KVM data for the session may be received from the host device at the packet receiving submodule 805 of the switching module. The packet inspection submodule 810 may determine that the packets are related to the session, and the rule-based switching submodule 815 may forward the packets to the first terminal device to enable the user to interact with a user interface of the session at the first terminal device.

Eventually, the user may log off of the first terminal device. The user roaming submodule 825 of the terminal selection module 715-a may detect the log off and forward a user logoff event to the rules engine 115-f. The user roaming rules module 835, the user rules module 840, and the login/logout rules module 850 may apply rules to the logoff event to infer that future session packets from the host device carrying the KVM data for the session should not be forwarded to any terminal device until the user logs on to another terminal device. Switching instructions to this effect may be provided to the rule-based switching submodule 815, and the incoming packets from the host device carrying the KVM data for the session are not forwarded by the switch device 110-g, even though the session module 705-a may continue communicating with the host device to maintain the session active.

If the user logs on to a second terminal device, the user roaming submodule 825 may detect the log on and forward a user logon event to the rules engine 115-f. The user roaming rules module 835, the user rules module 840, and the login/logout rules module 850 may apply rules to the logon event to infer that future session packets from the host device carrying KVM data for the session are to be forwarded to the second terminal device. Switching instructions to this effect may be provided to the rule-based switching submodule 815 of the switching module 710-a, and the KVM data for the session may be forwarded from the switch device 110-g to the second terminal device.

In an additional or alternative example, a user at a first terminal device may wish to share all or a portion of data for a session associated with that user with another user at a second terminal device. For instance, the user may wish to share a particular window of the session with the second user at the second terminal device. A request to share the window with the second terminal device may be received at the terminal multiplexing/parsing submodule 830 from the first terminal device. This request may trigger a sharing event transmitted from the terminal selection module 715-a to the rules engine 115-f. The user rules module 840 and/or the session multiplexing rules module 845 may apply rules to the received event to determine whether the sharing is permissible. If the sharing is determined to be permissible, the rules engine 115-f may update the switching instructions at the rule-based switching submodule such that packets received at the switch device 110-g containing data related to the shared window are mirrored to the second terminal device.

Figure 9:
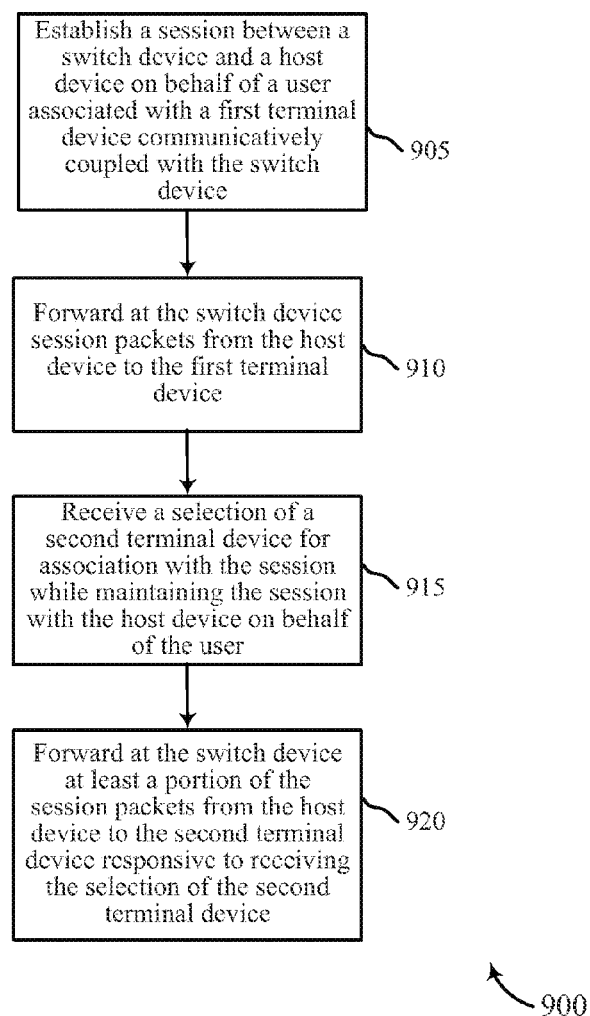
FIG. 9 is a flowchart diagram of an example method of dynamically multiplexing session data between multiple terminal devices according to various embodiments of the invention.

FIG. 9 illustrates a flowchart of an example method 900 of dynamically multiplexing user sessions among multiple terminal devices. The method 900 may be performed, for example, by the switch device 110 and/or the rules engine 115 of FIGS. 1-8.

At block 905, a session is established between a switch device and a host device on behalf of a user associated with a first terminal device communicatively coupled with the switch device. At block 910, the switch device forwards session packets from the host device to the first terminal device. At block 915, a selection is received of a second terminal device for association with the session while maintaining the session with the host device on behalf of the user. At block 920, the switch device forwards at least a portion of the session packets from the host device to the second terminal device responsive to receiving the selection of the second terminal device.

In certain examples, the selection of the second terminal device may be received as a request to share a portion of the session with the second terminal device. In such examples, the portion of the packets forwarded by the switch device to the second terminal device may include data associated with the portion of the session to be shared with the second terminal device. Thus, the portion of the packets may be forwarded from the switch device to the first terminal device and the second terminal device substantially concurrently.

In alternate examples, the second terminal device may be selected as a replacement destination for the session packets. In some such examples, the selection of the second terminal device may be received as a determination that the user has logged off of the first terminal device and logged on to the second terminal device. The switch device may maintain the session with the host device on behalf of the user after the user has logged off of the first terminal device and before the user has logged on to the second terminal device. The forwarding of packets associated with the session to the first terminal device may be terminated at the switch device in response to the determination that the user has logged off of the first terminal device.

In additional or alternative examples, at least one event associated with the user at the switching device may be identified and a set of rules may be applied to the at least one event to identify at least one instruction to forward at least the portion of the packets associated with the session to the second terminal device. In certain examples, the receiving the selection of the second terminal device may include the identification of the at least one instruction.

In certain examples, forwarding at least the portion of the session packets to the second terminal device may include receiving the packets from the host device at the switching device and modifying a destination address in the packets from an address associated with the switching device to an address associated with at least one of the terminal devices.

Figure 10:
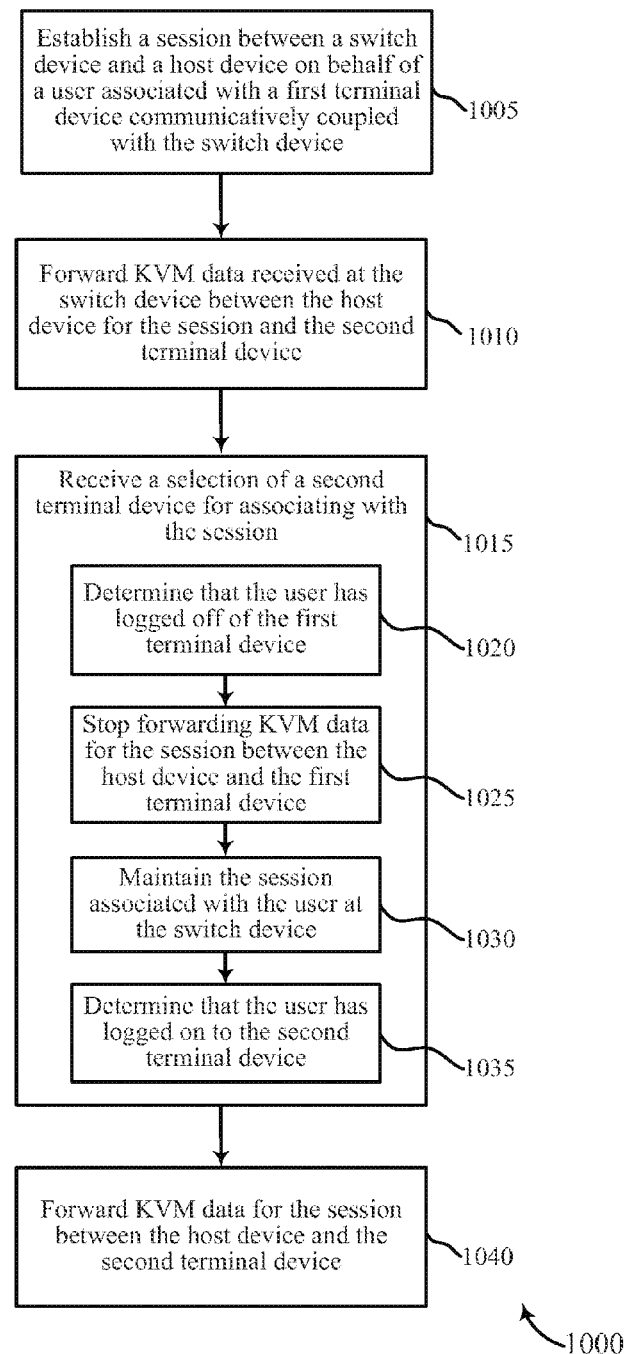
FIG. 10 is a flowchart diagram of an example method of dynamically multiplexing session data between multiple terminal devices according to various embodiments of the invention.

FIG. 10 illustrates a flowchart of an example method 1000 of dynamically multiplexing user sessions among multiple terminal devices. The method 1000 may be performed, for example, by the switch device 110 and/or the rules engine 115 of FIGS. 1-8.

At block 1005, a session is established between a switch device and a host device on behalf of a user associated with a first terminal device communicatively coupled with the switch device. At block 1010, KVM data received at the switch device is forwarded between the host device and the second terminal device. At block 1015, a selection is received of a second terminal device for associating with the session. The selection of the second terminal device is received by determining that the user has logged off of the first terminal device at block 1020, stopping the forwarding of session KVM data between the host device and the first terminal device at block 1025, maintaining the session associated with the user at the switch device at block 1030, and determining that the user has logged on to the second terminal device at block 1035. At block 1040, the KVM data for the session is forwarded between the host device and the second terminal device.

Figure 11:
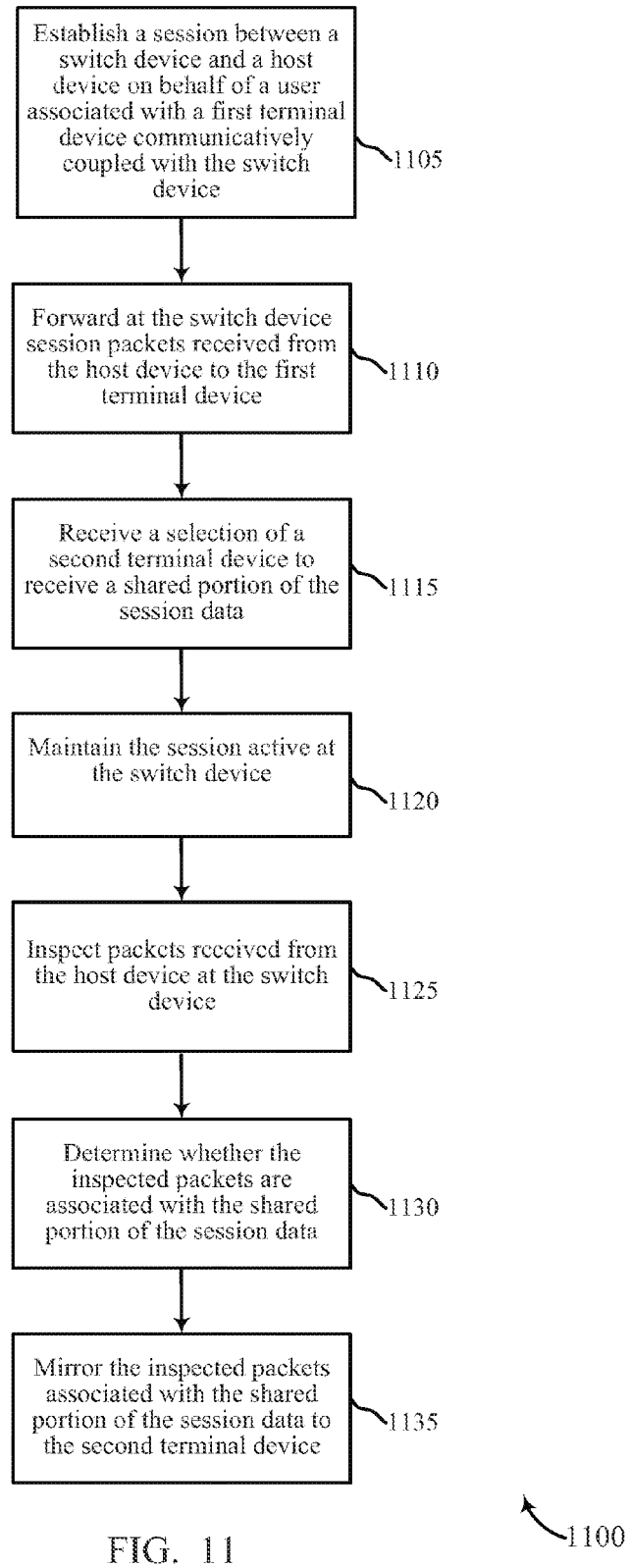
FIG. 11 is a flowchart diagram of an example method of dynamically multiplexing session data between multiple terminal devices according to various embodiments of the invention.

FIG. 11 illustrates a flowchart of an example method 1100 of dynamically multiplexing user sessions among multiple terminal devices. The method 1100 may be performed, for example, by the switch device 110 and/or the rules engine 115 of FIGS. 1-8.

At block 1105, a session is established between a switch device and a host device on behalf of a user associated with a first terminal device communicatively coupled with the switch device. At block 1110, session packets received from the host device at the switch device are forwarded to the first terminal device. At block 1115, a selection is received of a second terminal device to receive a shared a portion of the session data. At block 1120, the session is maintained active at the switch device. At block 1125, packets received from the host device are inspected at the switch device. At block 1130, a determination is made as to whether the inspected packets are associated with the shared portion of the session data. At block 1135, the inspected packets associated with the shared portion of the session data are mirrored to the second terminal device.

FIG. 11 illustrates a flowchart of an example method 1100 of dynamically multiplexing user sessions among multiple terminal devices. The method 1100 may be performed, for example, by the switch device 110 and/or the rules engine 115 of FIGS. 1-8.

At block 1105, a session is established between a switch device and a host device on behalf of a user associated with a first terminal device communicatively coupled with the switch device. At block 1110, session packets received from the host device at the switch device are forwarded to the first terminal device. At block 1115, a selection is received of a second terminal device to receive a shared a portion of the session data. At block 1120, the session is maintained, active at the switch device. At block 1125, packets received from the host device are inspected at the switch device. At block 1130, a determination is made as to whether the inspected packets are associated with the shared portion of the session data. At block 1135, the inspected packets associated with the shared portion of the session data are mirrored to the second terminal device.

Figure 12:
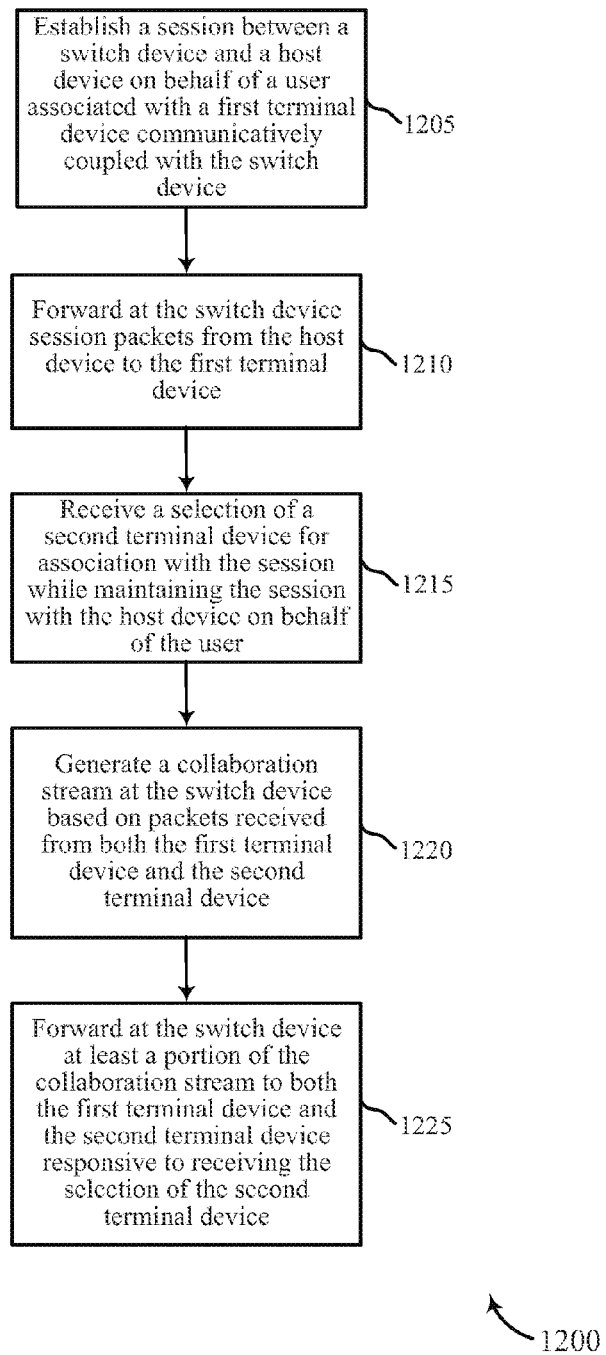
FIG. 12 is a flowchart diagram of an example method of dynamically multiplexing session data between multiple terminal devices according to various embodiments of the invention.

FIG. 12 illustrates a flowchart of another example method 1200 of dynamically multiplexing user sessions among multiple terminal devices. The method 1200 may be performed, for example, by the switch device 110 and/or the rules engine 115 of FIGS. 1-8.

At block 1205, a session is established between a switch device and a host device on behalf of a user associated with a first terminal device communicatively coupled with the switch device. At block 1210, session packets received from the host device at the switch device are forwarded to the first terminal device. At block 1215, a selection is received of a second terminal device to receive a shared a portion of the session data while maintaining the session with the host device on behalf of the user. At block 1220, a collaboration stream is generated at the switch device based on packets received from both the first terminal device and the second terminal device. At block 1225, at least a portion of the collaboration is forwarded at the switch device to both the first terminal device and the second terminal device in response to receiving the selection of the second terminal device. In certain examples, the data transmitted to the second terminal device may include session data intended for the first terminal device. In certain examples, transmitting the data to the second terminal device may include copying packets directed to or from the first terminal device at the switch device and mirroring those packets to the second terminal device.

Figure 13:
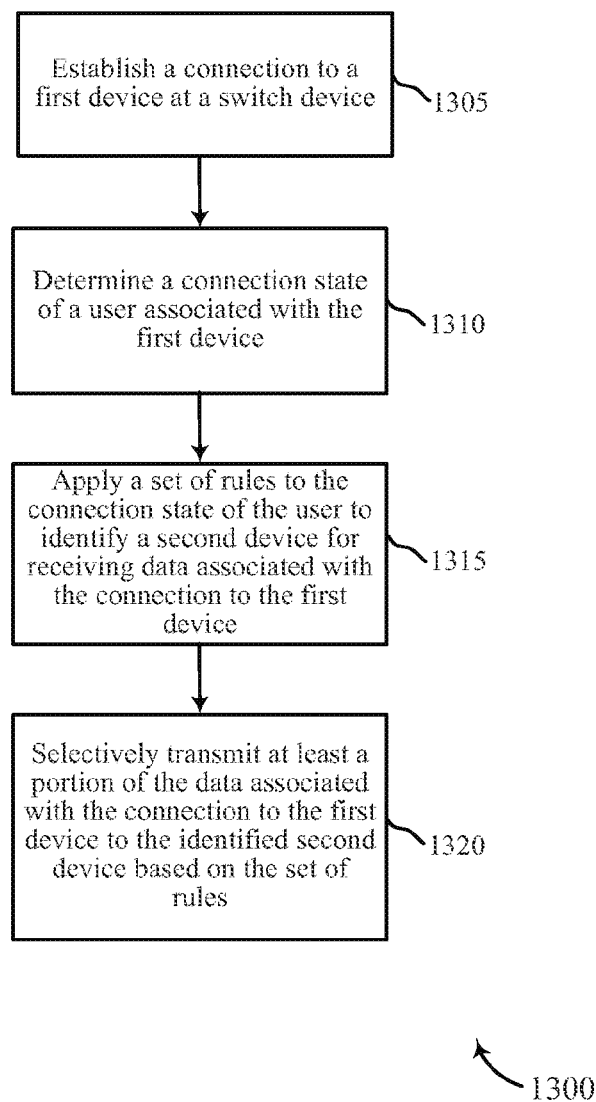
FIG. 13 is a flowchart diagram of an example method of dynamically multiplexing data between multiple terminal devices according to various embodiments of the invention.

FIG. 13 illustrates a flowchart of another example method 1300 of dynamically multiplexing session data among multiple terminal devices. The method 1300 may be performed, for example, by the switch device 110 and/or the rules engine 115 of FIGS. 1-8.

At block 1305, a connection to a first device is established at a switch device. At block 1310, a connection state of a user associated with the first device is determined in certain examples, determining the connection state of the user may include determining that the user is associated with a session executed at a host device and/or determining whether such a session is active. Additionally or alternatively, determining the connection state of the user may include determining that no session exists for the user at the host device. At block 1315, a set of rules is applied to the determined connection state of the user to identify a second device for receiving data associated with the connection to the first device. At block 1320, at least a portion of the data associated with the connection to the first device is selectively transmitted to the identified second device based on the set of rules.

Figure 14:
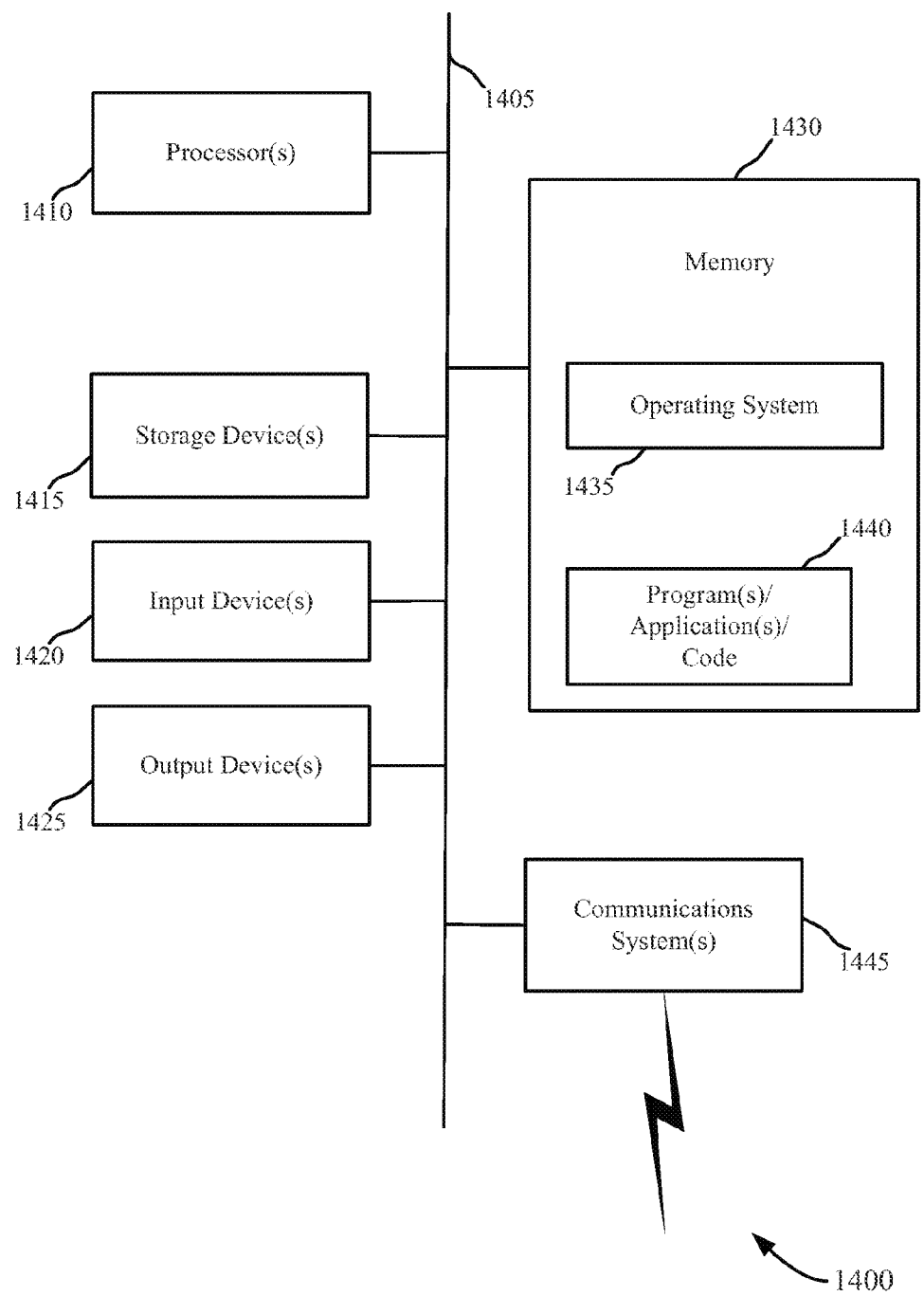
FIG. 14 is a schematic diagram that illustrates a representative device structure that may be used in various embodiments of the present invention.

A device structure 1400 that may be used for a host device 105, a switch device 110, a rules engine 115, a terminal device 120, a peripheral device 125, or other computing devices described herein, is illustrated with the schematic diagram of FIG. 14. This drawing broadly illustrates how individual system elements of each of the aforementioned devices may be implemented, whether in a separated or more integrated manner. The exemplary structure is shown comprised of hardware elements that are electrically coupled via bus 1405, including processor(s) 1410 (which may further comprise a DSP or special-purpose processor), storage device(s) 1415, input device(s) 1420, and output device(s) 1425. The storage device (s) 1415 may be a machine-readable storage media reader connected to any machine-readable storage medium, the combination comprehensively representing remote, local, fixed, or removable storage devices or storage media for temporarily or more permanently containing computer-readable information. The communications systems interface 1445 may interface to a wired, wireless, or other type of interfacing connection that permits data to be exchanged with other devices. The communications system(s) interface 1445 may permit data to be exchanged with a network.

The structure 1400 may also include additional software elements, shown as being currently located within working memory 1430, including an operating system 1435 and other code 1440, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

These components may, individually, or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of dynamically multiplexing data among terminal devices, the method comprising:
   establishing a connection with a first device at a switch device;
   determining a connection state of a user associated with the first device;
   applying a set of rules to the connection state of the user to identify a second device for receiving data associated with the connection to the first device; and
   selectively transmitting at least a portion of the data associated with the connection with the first device to the identified second device based on the set of rules.

2. The method of claim 1, wherein the determining the connection state of the user comprises:
   determining a status of a session associated with the user executed at a host device communicatively coupled with the switch device.

3. The method of claim 2, wherein the connection comprises an exchange of data for the session executed at the host device.

4. The method of claim 2, wherein the determining the connection state of the user comprises:
   determining that no session associated with the user exists at the host device communicatively coupled with the switch device.

5. The method of claim 1, wherein the selectively transmitting at least the portion of the data associated with the connection with the first device to the identified second device comprises:
   copying packets directed to the first device over the connection; and
   transmitting the copied packets to the second device.

6. The method of claim 2, wherein the determining the connection state of the user comprises:
   receiving a login event associated with the user at the second device; and
   determining based on the login event that the user has moved from the first device to the second device.

7. The method of claim 6, further comprising:
   disassociating the first device from the session associated with the user;
   maintaining the session associated with the user active at the switch device; and
   associating the second device with the session associated with the user.

8. The method of claim 1, wherein the determining the connection state of the user comprises:
   receiving data associated with a connection to the second device; and
   selectively merging at least a portion of the data associated with the connection to the second device with the data associated with the connection to the first device based on the set of rules.

9. A system for dynamically multiplexing data among terminal devices, comprising:
   a first device;
   a second device; and
   a switch device communicatively coupled with the first and second devices, the switch device configured to:
   establish a connection with the first device at a switch device;

determine a connection state of the user for the first device;

apply a set of rules to the connection state of the user to identify the second device for receiving data associated with the connection to the first device; and selectively transmit at least a portion of the data associated with the connection with the first device to the second device based on the set of rules.

10. The system of claim 9, wherein the switch device is configured to determine the connection state of the user by:

determining a status of a session associated with the user executed at a host device communicatively coupled with the switch device.

11. The system of claim 10, wherein the connection comprises an exchange of data for the session executed at the host device.

12. The system of claim 10, wherein the switch device is configured to determine the connection state of the user by:

determining that no session associated with the user exists at the host device communicatively coupled with the switch device.

13. The system of claim 10, wherein the switch device is configured to determine the connection state of the user by:

receiving a login event associated with the user at the second device; and determining based on the login event that the user has moved from the first device to the second device.

14. The system of claim 13, wherein the switch device is further to:

disassociate the first device from the session associated with the user;

maintain the session associated with the user active at the switch device; and associate the second device with the session associated with the user.

15. The system of claim 9, wherein the switch device is configured to determine the connection state of the user by:

receive data associated with a connection to the second device; and selectively merging at least a portion of the data associated with the connection to the second device with the data associated with the connection to the first device based on the set of rules.

16. The system of claim 9, wherein the switch device is further configured to:

copy packets directed to the first device over the connection; and transmit the copied packets to the second device.

17. A switch device apparatus, comprising:

means for establishing a connection with a first device at a switch device;

means for determining a connection state of a user associated with the first device;

means for applying a set of rules to the connection state of the user to identify a second device for receiving data associated with the connection to the first device; and means for selectively transmitting at least a portion of the data associated with the connection with the first device to the identified second device based on the set of rules.

18. The apparatus of claim 17, wherein the means for determining the connection state of the user comprises:

means for determining a status of a session associated with the user executed at a host device communicatively coupled with the switch device.

19. The apparatus of claim 18, wherein the connection comprises an exchange of data for the session executed at the host device.

20. The apparatus of claim 18, wherein the means for determining the connection state of the user comprises:

means for determining that no session associated with the user exists at the host device communicatively coupled with the switch device.

21. The apparatus of claim 18, wherein the means for determining the connection state of the user comprises:

means for receiving a login event associated with the user at the second device; and means for determining based on the login event that the user has moved from the first device to the second device.

22. The apparatus of claim 21, further comprising:

means for disassociating the first device from the session associated with the user;

means for maintaining the session associated with the user active at the switch device; and means for associating the second device with the session associated with the user.

23. The apparatus of claim 17, wherein the means for determining the connection state of the user comprises:

means for receiving data associated with a connection to the second device; and means for selectively merging at least a portion of the data associated with the connection to the second device with the data associated with the connection to the first device based on the set of rules.

24. The apparatus of claim 17, further comprising:

means for copying packets directed to the first device over the connection; and means for transmitting the copied packets to the second device.

* * * * *